US011977732B2

(12) United States Patent
Brody et al.

(10) Patent No.: US 11,977,732 B2
(45) Date of Patent: May 7, 2024

(54) HYBRIDIZATION OF VOICE NOTES AND CALLING

(71) Applicant: Snap Inc., Santa Monica, CA (US)

(72) Inventors: Jonathan Brody, Marina Del Rey, CA (US); Matthew Hanover, Los Angeles, CA (US); Chamal Samaranayake, Venice, CA (US); William Wu, Marina del Rey, CA (US)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 17/648,374

(22) Filed: Jan. 19, 2022

(65) Prior Publication Data

US 2022/0137810 A1    May 5, 2022

Related U.S. Application Data

(63) Continuation of application No. 16/947,709, filed on Aug. 13, 2020, now Pat. No. 11,256,414, which is a
(Continued)

(51) Int. Cl.
*G06F 3/048* (2013.01)
*G06F 3/01* (2006.01)
(Continued)

(52) U.S. Cl.
CPC .......... *G06F 3/04883* (2013.01); *G06F 3/017* (2013.01); *G06F 3/0484* (2013.01);
(Continued)

(58) Field of Classification Search
None
See application file for complete search history.

(56) References Cited

U.S. PATENT DOCUMENTS 6,038,295 A    3/2000  Mattes
6,366,651 B1   4/2002  Griffith et al.
(Continued)

FOREIGN PATENT DOCUMENTS

CA    2887596 A1    7/2015
CN    1943131 A     4/2007
(Continued)

OTHER PUBLICATIONS

U.S. Appl. No. 14/949,785 U.S. Pat. No. 10,775,996, filed Nov. 23, 2015, Hybridization of Voice Notes and Calling.
(Continued)

*Primary Examiner* — Hua Lu
(74) *Attorney, Agent, or Firm* — SCHWEGMAN LUNDBERG & WOESSNER, P.A.

(57) ABSTRACT

A system and method for receiving a user interaction with a user interface of a client device, determining a current communication mode and a desired communication mode, where the desired communication mode is determined based on the user interaction received by the sensor module. The system further sets the desired communication mode as the current communication mode, and causes presentation of a user interface of the client device based on the desired communication mode being set as the current communication mode.

20 Claims, 19 Drawing Sheets

Related U.S. Application Data continuation of application No. 14/949,785, filed on Nov. 23, 2015, now Pat. No. 10,775,996.

(60) Provisional application No. 62/119,963, filed on Feb. 24, 2015, provisional application No. 62/085,209, filed on Nov. 26, 2014.

(51) Int. Cl.
*G06F 3/0484* (2022.01)
*G06F 3/04842* (2022.01)
*G06F 3/04845* (2022.01)
*G06F 3/04883* (2022.01)
*H04M 1/72403* (2021.01)
*H04M 1/72433* (2021.01)
*H04M 1/72436* (2021.01)

(52) U.S. Cl.
CPC ...... *G06F 3/04842* (2013.01); *G06F 3/04845* (2013.01); *H04M 1/72403* (2021.01); *H04M 1/72433* (2021.01); *H04M 1/72436* (2021.01); *H04M 2250/22* (2013.01)

(56) References Cited

U.S. PATENT DOCUMENTS

| | | | |
|---|---|---|---|
| 6,763,226 B1 * | 7/2004 | McZeal, Jr. | H04M 1/7243 455/575.1 |
| 6,980,909 B2 | 12/2005 | Root et al. | |
| 7,173,651 B1 | 2/2007 | Knowles | |
| 7,411,493 B2 | 8/2008 | Smith | |
| 7,535,890 B2 | 5/2009 | Rojas | |
| 7,640,293 B2 * | 12/2009 | Wilson | H04L 51/58 709/239 |
| 7,971,156 B2 | 6/2011 | Albertson et al. | |
| 7,996,793 B2 | 8/2011 | Latta et al. | |
| 8,131,597 B2 | 3/2012 | Hudetz | |
| 8,199,747 B2 | 6/2012 | Rojas et al. | |
| 8,332,475 B2 | 12/2012 | Rosen et al. | |
| 8,352,245 B1 * | 1/2013 | Lloyd | G10L 15/22 704/9 |
| 8,487,938 B2 | 7/2013 | Latta et al. | |
| 8,648,799 B1 * | 2/2014 | Lloyd | G06F 3/0346 345/169 |
| 8,718,333 B2 | 5/2014 | Wolf et al. | |
| 8,724,622 B2 | 5/2014 | Rojas | |
| 8,856,691 B2 | 10/2014 | Geisner et al. | |
| 8,874,677 B2 | 10/2014 | Rosen et al. | |
| 8,909,679 B2 | 12/2014 | Root et al. | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,100,806 B2 | 8/2015 | Rosen et al. | |
| 9,100,807 B2 | 8/2015 | Rosen et al. | |
| 9,111,538 B2 | 8/2015 | Lau et al. | |
| 9,191,776 B2 | 11/2015 | Root et al. | |
| 9,204,252 B2 | 12/2015 | Root | |
| 9,225,897 B1 | 12/2015 | Sehn et al. | |
| 9,230,160 B1 | 1/2016 | Kanter | |
| 9,268,407 B1 * | 2/2016 | Noble | G06F 3/005 |
| 9,276,886 B1 | 3/2016 | Samaranayake | |
| 9,443,227 B2 | 9/2016 | Evans et al. | |
| 9,489,661 B2 | 11/2016 | Evans et al. | |
| 9,491,134 B2 | 11/2016 | Rosen et al. | |
| 9,705,831 B2 | 7/2017 | Spiegel | |
| 9,742,713 B2 | 8/2017 | Spiegel et al. | |
| 10,102,423 B2 | 10/2018 | Shaburov et al. | |
| 10,284,508 B1 | 5/2019 | Allen et al. | |
| 10,439,972 B1 | 10/2019 | Spiegel et al. | |
| 10,509,466 B1 | 12/2019 | Miller et al. | |
| 10,514,876 B2 | 12/2019 | Sehn | |
| 10,579,869 B1 | 3/2020 | Xiong et al. | |
| 10,591,730 B2 | 3/2020 | Rodriguez, II et al. | |
| 10,614,855 B2 | 4/2020 | Huang | |
| 10,748,347 B1 | 8/2020 | Li et al. | |
| 10,775,996 B2 | 9/2020 | Brody et al. | |
| 10,958,608 B1 | 3/2021 | Allen et al. | |
| 10,962,809 B1 | 3/2021 | Castañeda | |
| 10,996,846 B2 | 5/2021 | Robertson et al. | |
| 10,997,787 B2 | 5/2021 | Ge et al. | |
| 11,012,390 B1 | 5/2021 | Al Majid et al. | |
| 11,030,454 B1 | 6/2021 | Xiong et al. | |
| 11,036,368 B1 | 6/2021 | Al Majid et al. | |
| 11,062,498 B1 | 7/2021 | Voss et al. | |
| 11,087,728 B1 | 8/2021 | Canberk et al. | |
| 11,092,998 B1 | 8/2021 | Castañeda et al. | |
| 11,106,342 B1 | 8/2021 | Al Majid et al. | |
| 11,126,206 B2 | 9/2021 | Meisenholder et al. | |
| 11,143,867 B2 | 10/2021 | Rodriguez, II | |
| 11,169,600 B1 | 11/2021 | Canberk et al. | |
| 11,227,626 B1 | 1/2022 | Krishnan Gorumkonda et al. | |
| 11,307,747 B2 | 4/2022 | Dancie et al. | |
| 11,531,402 B1 | 12/2022 | Stolzenberg | |
| 11,546,505 B2 | 1/2023 | Canberk | |
| 2005/0105712 A1 * | 5/2005 | Williams | G10L 13/027 704/275 |
| 2005/0281477 A1 * | 12/2005 | Shiraki | G06T 5/003 382/255 |
| 2006/0052127 A1 * | 3/2006 | Wolter | H04L 65/4061 455/519 |
| 2006/0053379 A1 | 3/2006 | Henderson et al. | |
| 2006/0089791 A1 * | 4/2006 | Hay | G01C 21/28 340/988 |
| 2006/0149558 A1 * | 7/2006 | Kahn | G10L 15/063 704/278 |
| 2008/0161059 A1 * | 7/2008 | Kraft | H04M 1/7243 455/566 |
| 2008/0316183 A1 * | 12/2008 | Westerman | G06F 3/04883 345/173 |
| 2009/0012788 A1 | 1/2009 | Gilbert et al. | |
| 2009/0181702 A1 * | 7/2009 | Vargas | H04L 51/56 455/466 |
| 2009/0213852 A1 * | 8/2009 | Krishnamurthi | H04L 51/234 370/389 |
| 2010/0161743 A1 * | 6/2010 | Krishnamurthi | H04L 51/234 709/206 |
| 2011/0003585 A1 * | 1/2011 | Wang | H04M 1/72469 455/418 |
| 2011/0159920 A1 * | 6/2011 | Lehmann | H04M 1/03 455/556.1 |
| 2011/0195758 A1 * | 8/2011 | Damale | H04M 1/72451 455/569.1 |
| 2011/0202598 A1 | 8/2011 | Evans et al. | |
| 2011/0223893 A1 * | 9/2011 | Lau | G10L 15/22 455/414.1 |
| 2011/0276903 A1 * | 11/2011 | Mehin | H04M 1/72439 715/758 |
| 2011/0301934 A1 | 12/2011 | Tardif | |
| 2012/0052871 A1 * | 3/2012 | Cochran | G06Q 30/0261 455/456.1 |
| 2012/0092277 A1 * | 4/2012 | Momchilov | G06F 3/038 345/173 |
| 2012/0110473 A1 * | 5/2012 | Tseng | G06Q 50/01 709/227 |
| 2012/0209924 A1 | 8/2012 | Evans et al. | |
| 2013/0019738 A1 * | 1/2013 | Haupt | G10H 1/06 84/622 |
| 2013/0045720 A1 | 2/2013 | Madhavapeddl et al. | |
| 2013/0053007 A1 * | 2/2013 | Cosman | G06F 3/017 455/414.3 |
| 2013/0132856 A1 * | 5/2013 | Binyamin | G06F 3/017 715/740 |
| 2013/0304457 A1 | 11/2013 | Kang et al. | |
| 2013/0316687 A1 | 11/2013 | Subbaramoo et al. | |
| 2014/0108928 A1 | 4/2014 | Mumick | |
| 2014/0171036 A1 | 6/2014 | Simmons | |
| 2015/0120293 A1 | 4/2015 | Wohlert et al. | |
| 2015/0127349 A1 * | 5/2015 | Agiomyrgiannakis | G06F 40/58 704/266 |

(56) References Cited

U.S. PATENT DOCUMENTS

| | | | |
|---|---|---|---|
| 2015/0242932 A1* | 8/2015 | Beguin | G06Q 30/06 705/26.8 |
| 2015/0317975 A1* | 11/2015 | Ruiz Rodriguez | H04M 3/533 704/235 |
| 2015/0370320 A1 | 12/2015 | Connor | |
| 2015/0371633 A1* | 12/2015 | Chelba | G10L 15/063 704/240 |
| 2016/0042738 A1* | 2/2016 | Belkin | H04M 3/42221 704/235 |
| 2016/0070354 A1* | 3/2016 | Liu | G06F 3/0346 345/156 |
| 2016/0077793 A1* | 3/2016 | Disano | G06F 3/04883 715/728 |
| 2016/0117372 A1* | 4/2016 | Krafft | G06F 3/04883 715/739 |
| 2016/0147435 A1 | 5/2016 | Brody et al. | |
| 2016/0217784 A1* | 7/2016 | Gelfenbeyn | G06F 3/04842 |
| 2017/0123487 A1 | 5/2017 | Hazra et al. | |
| 2017/0180499 A1* | 6/2017 | Gelfenbeyn | H04L 51/02 |
| 2017/0277684 A1 | 9/2017 | Dharmarajan Mary | |
| 2017/0277685 A1 | 9/2017 | Takumi | |
| 2017/0351910 A1 | 12/2017 | Elwazer et al. | |
| 2018/0158370 A1 | 6/2018 | Pryor | |
| 2019/0146219 A1 | 5/2019 | Rodriguez, II | |
| 2020/0371682 A1 | 11/2020 | Brody et al. | |
| 2021/0011612 A1 | 1/2021 | Dancie et al. | |
| 2021/0074016 A1 | 3/2021 | Li et al. | |
| 2021/0166732 A1 | 6/2021 | Shaburova et al. | |
| 2021/0174034 A1 | 6/2021 | Retek et al. | |
| 2021/0241529 A1 | 8/2021 | Cowburn et al. | |
| 2021/0303075 A1 | 9/2021 | Cowburn et al. | |
| 2021/0303077 A1 | 9/2021 | Anvaripour et al. | |
| 2021/0303140 A1 | 9/2021 | Mourkogiannis | |
| 2021/0382564 A1 | 12/2021 | Blachly et al. | |
| 2021/0397000 A1 | 12/2021 | Rodriguez, II | |
| 2021/0405761 A1 | 12/2021 | Canberk | |
| 2022/0188539 A1 | 6/2022 | Chan et al. | |
| 2022/0206588 A1 | 6/2022 | Canberk et al. | |
| 2022/0300730 A1 | 9/2022 | Eirinberg et al. | |
| 2022/0300731 A1 | 9/2022 | Eirinberg et al. | |
| 2022/0301231 A1 | 9/2022 | Eirinberg et al. | |
| 2022/0326781 A1 | 10/2022 | Hwang et al. | |
| 2022/0334649 A1 | 10/2022 | Hwang et al. | |
| 2022/0375174 A1 | 11/2022 | Arya et al. | |

FOREIGN PATENT DOCUMENTS

| | | |
|---|---|---|
| CN | 101185314 A | 5/2008 |
| CN | 101237482 A | 8/2008 |
| CN | 102651903 A | 8/2012 |
| CN | 103049761 B | 8/2016 |
| CN | 113268191 A | 8/2021 |
| EP | 3224706 B1 | 9/2019 |
| EP | 3707693 A1 | 9/2020 |
| EP | 4172726 A1 | 5/2023 |
| EP | 4172730 A1 | 5/2023 |
| KR | 20060129761 A | 12/2006 |
| KR | 20070026350 A | 3/2007 |
| KR | 1020070026350 A | 3/2007 |
| KR | 101953047 B1 | 2/2019 |
| KR | 102083401 B1 | 2/2020 |
| KR | 102286898 B1 | 8/2021 |
| KR | 20220158824 A | 12/2022 |
| WO | WO-2016085936 A1 | 6/2016 |
| WO | WO-2016168591 A1 | 10/2016 |
| WO | WO-2019094618 A1 | 5/2019 |
| WO | WO-2022005687 A1 | 1/2022 |
| WO | WO-2022005693 A1 | 1/2022 |
| WO | WO-2022060549 A2 | 3/2022 |
| WO | WO-2022066578 A1 | 3/2022 |
| WO | WO-2022060549 A3 | 4/2022 |
| WO | WO-2022132381 A1 | 6/2022 |
| WO | WO-2022146678 A1 | 7/2022 |
| WO | WO-2022198182 A1 | 9/2022 |
| WO | WO-2022216784 A1 | 10/2022 |
| WO | WO-2022225761 A1 | 10/2022 |
| WO | WO-2022245765 A1 | 11/2022 |

OTHER PUBLICATIONS

U.S. Appl. No. 16/947,709, filed Aug. 13, 2020, Hybridization of Voice Notes and Calling.
"U.S. Appl. No. 14/949,785, Examiner Interview Summary dated May 5, 2020", 3 pgs.
"U.S. Appl. No. 14/949,785, Final Office Action dated Mar. 23, 2020", 17 pgs.
"U.S. Appl. No. 14/949,785, Final Office Action dated Aug. 9, 2018", 20 pgs.
"U.S. Appl. No. 14/949,785, Non Final Office Action dated Dec. 2, 2019", 15 pgs.
"U.S. Appl. No. 14/949,785, Non Final Office Action dated Dec. 11, 2017", 18 pgs.
"U.S. Appl. No. 14/949,785, Notice of Allowance dated May 18, 2020", 8 pgs.
"U.S. Appl. No. 14/949,785, Response filed Feb. 24, 2020 to Non Final Office Action dated Dec. 2, 2019", 12 pgs.
"U.S. Appl. No. 14/949,785, Response filed Apr. 10, 2018 to Non Final Office Action dated Dec. 11, 2017", 20 pgs.
"U.S. Appl. No. 14/949,785, Response filed May 7, 2020 to Final Office Action dated Mar. 23, 2020", 13 pgs.
"U.S. Appl. No. 14/949,785, Response filed Sep. 24, 2018 to Final Office Action dated Aug. 9, 2018", 11 pgs.
"U.S. Appl. No. 16/947,709, Non Final Office Action dated Jun. 25, 2021", 17 pgs.
"U.S. Appl. No. 16/947,709, Notice of Allowance dated Oct. 14, 2021", 8 pgs.
"U.S. Appl. No. 16/947,709, Response filed Sep. 20, 2021 to Non Final Office Action dated Jun. 25, 2021", 11 pgs.
"Chinese Application Serial No. 201580063705.0, Office Action dated Jan. 6, 2021", w/ English Translation, 10 pgs.
"Chinese Application Serial No. 201580063705.0, Office Action dated Aug. 4, 2020", w/ English Translation, 32 pgs.
"Chinese Application Serial No. 201580063705.0, Office Action dated Oct. 21, 2019", W/ English Translation, 18 pgs.
"Chinese Application Serial No. 201580063705.0, Response filed Mar. 1, 2021 to Office Action dated Jan. 6, 2021", w/ English Claims, 17 pgs.
"Chinese Application Serial No. 201580063705.0, Response filed Mar. 5, 2020 to Office Action dated Oct. 21, 2019", w/ English Claims, 15 pgs.
"Chinese Application Serial No. 201580063705.0, Response filed Sep. 15, 2020 to Office Action dated Aug. 4, 2020", w/ English Claims, 17 pgs.
"European Application Serial No. 15816934.2, Response filed Jan. 12, 2018 to Communication pursuant to Rules 161(1) and 162 EPC dated Jul. 4, 2017", 186.
"European Application Serial No. 19183828.3, Extended European Search Report dated Dec. 20, 2019", 9 pgs.
"European Application Serial No. 19183828.3, Response filed Jun. 2, 2020 to Extended European Search Report dated Dec. 20, 2019", 14 pgs.
"International Application Serial No. PCT/US2015/062339, International Preliminary Report on Patentability dated Jun. 8, 2017", 8 pgs.
"International Application Serial No. PCT/US2015/062339, International Search Report dated Mar. 2, 2016", 4 pgs.
"International Application Serial No. PCT/US2015/062339, Written Opinion dated Mar. 2, 2016", 6 pgs.
"Korean Application Serial No. 10-2017-7017548, Notice of Preliminary Rejection dated May 10, 2018", w/ English translation, 10 pgs.
"Korean Application Serial No. 10-2017-7017548, Response filed Jul. 10, 2018 to Notice of Preliminary Rejection dated May 10, 2018", w/ English Claims, 34 pgs.

(56) References Cited

OTHER PUBLICATIONS

"Korean Application Serial No. 10-2019-7004921, Notice of Preliminary Rejection dated May 17, 2019", w/ English Translation, 9 pgs.

"Korean Application Serial No. 10-2019-7004921, Response filed Jul. 17, 2019 to Notice of Preliminary Rejection dated May 17, 2019", w/ English Claims, 16 pgs.

"Korean Application Serial No. 10-2020-7023741, Office Action dated Nov. 16, 2020", w/ English Translation, 6 pgs.

"Korean Application Serial No. 10-2020-7023741, Response field Dec. 10, 2020 to Office Action dated Nov. 16, 2020", w/ English Claims, 24 pgs.

Faas, "Secrets of Mac trackpad, from iBook to MacBook Air",[Online]. Retrieved from the Internet: <https://www.macworld.com/article/1134343/macbooks/maclaptop-trackpad.html>, (2008).

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

"Chinese Application Serial No. 202110589224.0, Office Action dated Oct. 28, 2023", w/ English Translation, 18 pgs.

\* cited by examiner

HYBRIDIZATION OF VOICE NOTES AND CALLING

RELATED APPLICATIONS

This application is a continuation of U.S. patent application Ser. No. 16/947,709, filed on Aug. 13, 2020, which is a continuation of U.S. patent application Ser. No. 14/949,785, filed on Nov. 23, 2015, which claims priority benefit of U.S. Provisional Application Ser. No. 62/085,209, filed on Nov. 26, 2014, and U.S. Provisional Application Ser. No. 62/119,963, filed on Feb. 24, 2015, each of which are hereby incorporated herein by reference in their entireties.

TECHNICAL FIELD

Embodiments of the present disclosure relate generally to the processing of data. More particularly, but not by way of limitation, the present disclosure addresses systems and methods for hybridization of text based communication, voice notes, and voice communication.

BACKGROUND

Telecommunications applications can provide communication between multiple users using a variety of media, such as text, images, sound recordings, and/or video recording, etc. These applications are generally directed at a single medium (e.g., text or voice) of communication. Transitioning between multiple applications to communicate using different media can be cumbersome, requiring a user to stop using one application, and begin engaging with another application. Thus, there are growing needs to improve the experience associated with telecommunication applications.

BRIEF DESCRIPTION OF THE DRAWINGS

Various ones of the appended drawings merely illustrate example embodiments of the present disclosure and should not be considered as limiting its scope.

Figure 1:
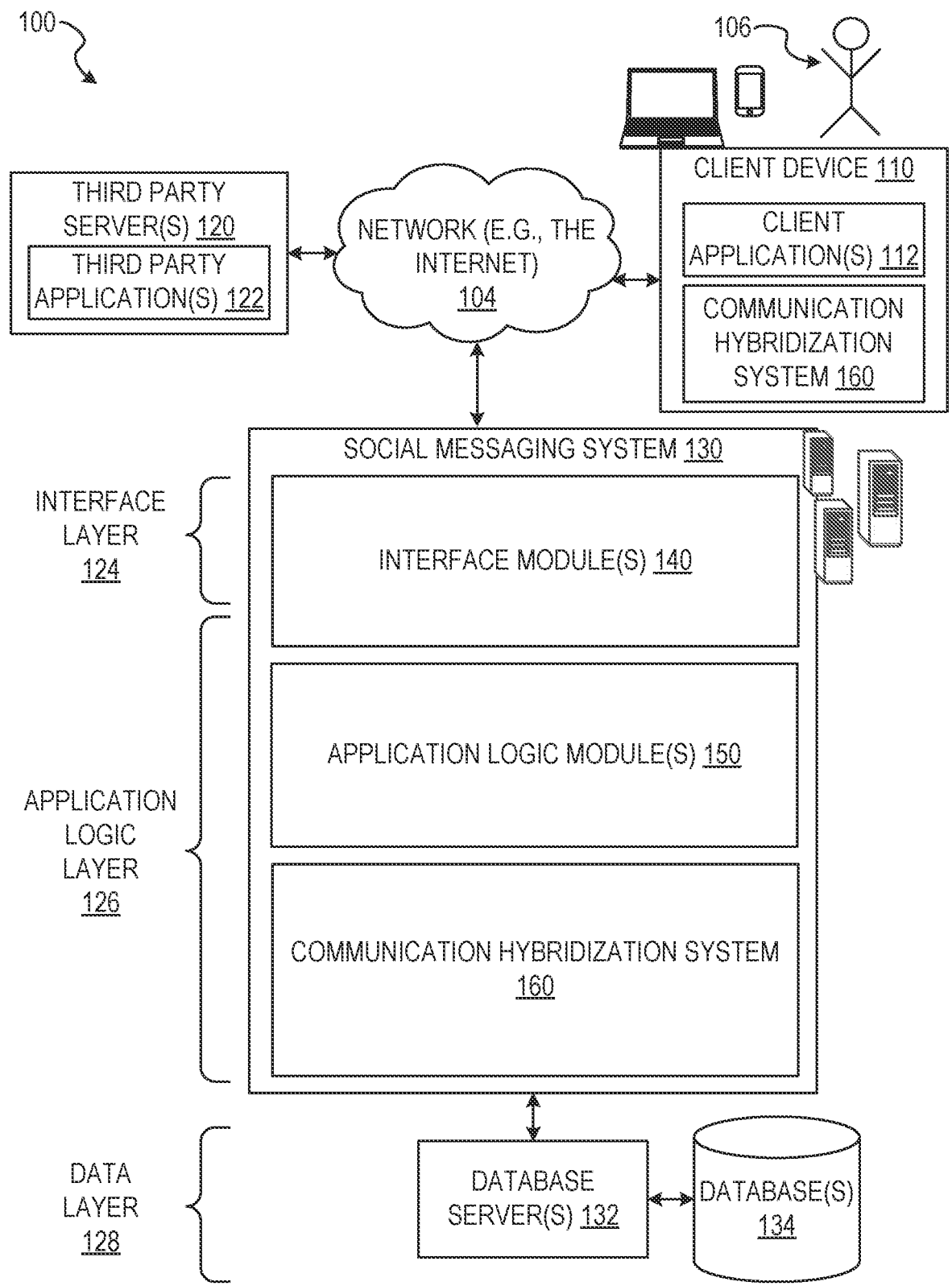
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

A communication hybridization system is described that allows two users to communicate using a combination of differing media (e.g., voice and text). The communication hybridization system uses gestures and orientation changes of a device to transition between communication modes employing differing media. Additionally, the communication hybridization system uses gestures and orientation changes of one or more parties to a communication to transition between synchronous or asynchronous communication. In some embodiments the communication may be within the context of a single application or across multiple applications.

Where the communication hybridization system facilitates transitions between synchronous and asynchronous communication among parties to a communication (users), the communication hybridization system can cause a change in communication mode (e.g., from a mode employing asynchronous communication to a mode employing synchronous communication) of a user device, being used by a party to the communication based on the gestures or orientation changes of other parties to the communication. For example, gestures and changes in orientation of one client device of one party can cause a change in communication mode of another client device of another party to the communication.

Further, in some embodiments, portions of the communication hybridization system can be integrated into or in communication with applications or an operating system operating on client devices being used by parties of the communication. In this way, the communication hybridization system can facilitate communication among users from any application, document, file, or instance of the operating system. In these embodiments, the communication hybridization system can facilitate communication between applications, transferring asynchronous or synchronous communication generated in a first application of a first client device to a second client device, and in some instances, a second application on the second client device. For instance, the communication hybridization system can receive a communication in the form of a voice recording from the first application of the first client device, perform a voice-to-text conversion to generate a transcribed communication, and transmit the transcribed communication to the second client device to be received by a second application or posted to a social media profile associated with the second client device.

As an example of an embodiment performing communication in a single application, a communication session between a first user and a second user is described below. To begin the communication session, the first user can swipe into chat with the second user using a touch-screen of mobile telephone (as an example of a client device). The first user raises the mobile phone to his ear and can begin to leave a voice note (other methods of initiating the voice note are also possible including, e.g., rotating the device 180 degrees, etc). While leaving the voice note, the second user may receive a push notification informing her of the incoming communication from the first user. Portions of the first user's voice note are transcribed into text and transmitted along with the voice note to the second user while the first user is composing the voice note.

The second user may start by reading a transcribed version of the first user's in-progress voice note to get a context for a conversation with the first user. Upon deciding that the conversation is of interest and wishing to then engage in a voice conversation with the first user, the second user may then raise her mobile telephone to her ear to speak with the first user (again, other methods of switching modes are possible including, e.g., rotating the device). In this way, the technology may enable the second user to change communication modes (e.g., between text and voice in response to the second user raising her device). Once the device is raised, thereby changing the communication mode, the second user and the first user can talk synchronously over a voice call.

During the voice call, the second user may choose to exit the synchronous voice call (e.g., as a result of entering an environment in which it would be difficult or inappropriate to talk). In this case, the second user can lower her mobile phone (or rotate the device) to exit the chat while the first user continues to talk. Based on the second user lowering her device, the first user's mobile phone switches back into a communication mode for recording voice notes. Similarly, the second user's device is placed back into a communication mode for receiving text and voice notes. The first user's device continues to record the first user until he is finished talking. The recording is sent to the second user's device as a new voice note or a continuation of the first user's voice note which started the communication. After he finishes talking, the first user can swipe the touch-screen of his device to end the chat.

After a period of time, the second user can swipe the touch-screen of her device to restore the chat with the first user. The system can present the second user with the voice note and a text version of the voice note left by the first user after the second user exited the chat.

Any number of user actions may be used to initiate a change in communication mode. As previously described, rotating a device 180 degrees may serve to position a microphone of a phone closer to a user's mouth. In these and other embodiments, rotating a device in this manner may initiate a speakerphone mode for voice (and/or voice note) communications. By rotating, the display screen of the user's device may rotate as well thereby allowing the user to continue utilizing the display of his/her device.

By way of further example, a user may switch communication modes by swiping up from a chat window thereby revealing a voice note, indicating to the user that he or she has entered a voice communication mode. In these embodiments, a user can exit voice communication mode by swiping down in the chat window.

An example system that may be used to facilitate the above described communication session is described in technical detail below, with reference to the above listed figures. The example system may include the communication hybridization system or set of modules performing the functions of a communication hybridization system. The communication hybridization system enables a user to transmit communication segments such as voice notes (e.g., voicemail messages and voice-to-text messages) and transition between interacting with communication segments to engaging in two-way communication with another user.

For example, a user can perform a touch-based gesture, such as a swipe right on a text input box, enabling the user to generate a communication segment for another user. In some instances the communication segment can be generated by recording and transmitting a voicemail note (herein, also referred to as an audio note) to another user (e.g., asynchronous communication). In some embodiments, the audio note (e.g., the communication segment) can be generated and transmitted in a chat session. In some instances the audio note can be generated and transmitted in an application distinct from a communication application (e.g., a chat client), and transmitted through a specified communication application or via transmission components and processes of the client device and the operating system of the user device.

The voicemail note can be an audio file, a voice-to-text message (e.g., a text message generated by transcription of the audio file), or a combination thereof. The user can also swipe right across a length of the text input box to engage in a voice call (e.g., synchronous communication) between users. The swipe motion can cause the communication hybridization system to present a communication segment icon (e.g., a microphone button), an interactive user interface element, or another indicator. In some embodiments, a waveform graphic or animation may be presented, as an overlay to the text input box, to the user to indicate that the user's voice is being recorded.

The swipe motion can be a user interface action where the user touches a touchscreen or otherwise manipulates a cursor, pointer, or the like in a direction across at least a portion of a screen depicting a portion of a user interface. For example, a user can place a finger on a touch-screen of the client device and drag the finger partially or fully across the touch-screen while maintaining contact with the touch-screen. Although described as a swipe right, it should be understood that the swipe motion can be in any suitable direction, combination of directions, or shape (or other suitable action).

The user can interact with the communication segment icon (e.g., pressing a portion of a touch screen proximate to the communication segment icon) to generate the communication segment (e.g., audio note). For example, the user can hold the communication segment icon for a period of time, during which the user can speak into an input (e.g., microphone) of a client device to generate the communication segment. When the user releases the communication segment icon, the communication segment is finished. The communication segment can then be transmitted as an audio note or can be transcribed and transmitted as a text-based communication segment. Where the communication segment is transcribed, the communication segment can be transcribed during the recording or generation of the communication segment or after generation of the communication segment has been completed.

Where the communication segment is an audio note, the communication hybridization system can replay the audio note for review, and then transmit the audio note to a second user. The audio note can also be transmitted automatically or upon interaction of the user with the communication hybridization system, such as by tapping an interactive transmission icon on a user interface screen. A recipient of the audio note can simultaneously receive the note in one or more of a text and audio format. For example, the audio note can be rendered into a text based message by the communication hybridization system, as described above, which presents both the transcribed text of the audio note and the audio to the recipient. The audio note can also be simultaneously represented by an audio file. Thus, the recipient can review the communication segment as either text or audio within the same presentation.

The communication hybridization system can switch between communication modes in response to a trigger such as movement or changes in position of the client device. For example, the communication hybridization system can switch between receiving a voice note and engaging in a call (e.g., full duplex communication) in response to detecting a change in spatial position or orientation of the client device (e.g., as determined by a gyroscope, accelerometer, or other sensor of the client device).

In some instances, a combination of a first user interaction (e.g., an orientation change or gesture) and a second user interaction causes the communication hybridization system to switch between communication modes. For example, a first user interaction of an orientation change of the device can cause a switch from a text based communication mode to a voice based communication mode (e.g., a telephone call). A second user interaction (e.g., speaking into a microphone of the device, prior to the device connecting the telephone call to another user) can cause a switch from the voice based communication mode (e.g., a telephone call) to a voice transcription mode. The voice transcription mode causes the communication hybridization system to transmit a text based communication segment transcribed from the voice interaction of the user. In this way, the communication mode can be dynamically adjusted based on one or more user interactions including gestures, tactile interaction with an input of a device, an orientation change, voice interactions, and other user interactions with the device.

The communication hybridization system can also base a switch or lack of switch in communication modes based on a mode indication of a second client device communicating with the client device. For example, in response to the movement or change in position of the client device, the communication hybridization system can attempt to switch to a communication mode for a telephone call. The communication hybridization system can receive a mode indication from the second or recipient device which is to be called. The mode indication can indicate that the recipient device is not available for a telephone call. As a result, the communication hybridization system can prevent the client device from switching to a call communication mode. For example, the communication hybridization system can maintain a text based communication mode, regardless of the change in position of the client device, in response to the mode indication.

Where the recipient client device transmits a mode indication, the communication hybridization system can determine a compatible communication mode which is compatible with the change of motion and the mode indication. For example, the recipient client device can transmit a mode indication indicating that it is unavailable for a telephone call. When the client device is moved into position for a telephone call, the communication hybridization system refrains from switching to a telephone call communication mode and instead switches to a voicemail note communication mode.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. Of course, additional functional modules and engines may be used with a social messaging system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface modules (e.g., a web server) 140, which receives requests from various client-computing devices and servers, such as client devices 110 executing client application(s) 112, and third party servers 120 executing third party application(s) 122. In response to received requests, the interface module 140 communicates appropriate responses to requesting devices via a network 104. For example, the interface modules 140 can receive requests such as Hypertext Transfer Protocol (HTTP) requests, or other web-based, Application Programming Interface (API) requests.

The client devices 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). In an example, the client devices 110 are executing the client application(s) 112. The client application(s) 112 can provide functionality to present information to a user 106 and communicate via the network 104 to exchange information with the social messaging system 130. Each of the client devices 110 can comprise a computing device that includes at least a display and communication capabilities with the network 104 to access the social messaging system 130. The client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User 106 can be a person, a machine, or other means of interacting with the client devices 110. In some embodiments, the user 106 interacts with the social messaging system 130 via the client devices 110. The user 106 may not be part of the networked environment, but may be associated with the client devices 110.

As shown in FIG. 1, the data layer 128 has database servers 132 that facilitate access to information storage repositories or databased 134. The database 134 are storage devices that store data such as member profile data, social graph data (e.g., relationships between members of the social messaging system 130), and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic modules 150, which, in conjunction with the interface modules 140, generate various user interfaces with data retrieved from various data sources or data services in the data layer 128. Individual application logic modules 150 may be used to implement the functionality associated with various applications, services, and features of the social messaging system 130. For instance, a social messaging application can be implemented with of the application logic modules 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic modules 150.

As illustrated in FIG. 1, the social messaging system 130 includes a communication hybridization system 160 capable of transmitting control signals the client device 110. Similarly, the client device 110 includes a portion of the communication hybridization system 160. In other examples, client device 110 may include the entirety of communication hybridization system 160. In instances where the client device 110 includes a portion of (or all of) the communication hybridization system 160, the client device 110 can work alone or in cooperation with the social messaging system 130 to provide the functionality of the communication hybridization system 160 described herein.

Figure 2:
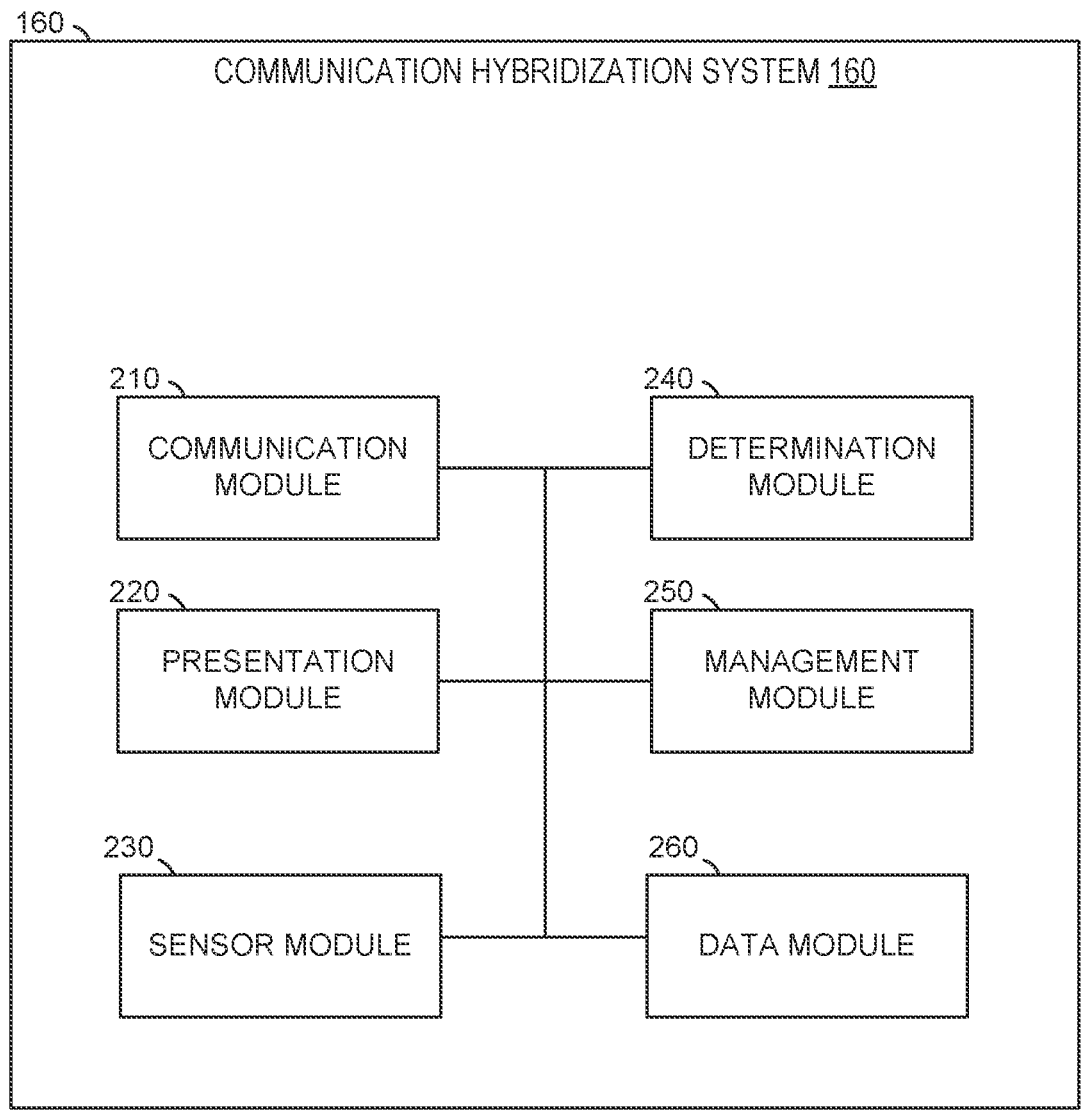
FIG. 2 is a diagram illustrating a communication hybridization system, according to some example embodiments.

In FIG. 2, in various embodiments, the communication hybridization system 160 can be implemented as a standalone system and is not necessarily included in the social messaging system 130. The communication hybridization system 160 is shown to include a communication module 210, a presentation module 220, a sensor module 230, a determination module 240, a management module 250, and a data module 260. All, or some, of the modules 210-260, communicate with each other, for example, via a network coupling, shared memory, and the like. Each module of modules 210-260 can be implemented as a single module, combined into other modules, or further subdivided into multiple modules. Other modules not pertinent to example embodiments can also be included, but are not shown.

The communication module 210 provides various communications functionality. For example, the communication module 210 receives communication data indicative of data received from an input of the client device 110. The communication data can be indicative of a message composed by a user on the client device for storage or for transmission to a client device of another user. The communication module 210 can cause transmission of the communication data between client devices, via a communications network, or may cause the client device 110 to store the communication data within the data module 260 or a storage medium associated with the data module 260.

In some instances, the communication module 210 includes a transcription module capable of receiving one or more communication segments (e.g., audio or voice communication data) and perform a voice-to-text conversion, transcribing words within the communication segment to generate a transcribed communication. The transcribed communication can be transmitted with or without the communication segment from which the transcribed communication was generated. The transcription module can include speech recognition operations and functions capable of transcribing spoken words of the communication segment into text.

In some embodiments, when the communication module 210 receives communication data indicative of an audio-based communication segment, the transcription module can generate a first interrupt to transcribe the communication segment. The transcription module can generate a second interrupt upon an indication of a termination of the communication segment. For example, the termination of the communication segment can be indicated by a pause in receiving communication data (e.g., cessation of speech for a predetermined period of time), a user interaction (e.g., interaction with a user interface element), an orientation change of the client device 110, or other interactions or triggers indicative of a termination of the communication segment.

The communication module 210 can also receive configuration data for a set of communication modes, such as interrupts causing a transition between multiple communication modes and notification indicators (e.g., notifying users of initiation, termination, or transition of communication sessions or communication modes). The communication module 210 can exchange network communications with the database servers 132, the client devices 110, and the third party servers 120. The information retrieved by the communication module 210 includes data associated with the user (e.g., member profile data from an online account or social network service data) or other data to facilitate the functionality described herein.

The presentation module 220 provides various presentation and user interface functionality operable to interactively present and receive information to and from the user. For instance, the presentation module 220 causes presentation of user interface elements with which the user 106 interacts to cause or initiate performance of operations of the communication hybridization system 160. Further, the presentation module 220 causes presentation of an indication of a message received, an indication of a message being entered (e.g., content of a message being entered prior to transmission of the message), and an indication of a message transmitted. The presentation module 220 causes presentation of indications or notifications on a user interface or in a display of the client device 110 (e.g., including the indication of a message being entered with a virtual keyboard or communication segment icon on the user interface of the client device 110). In embodiments where the communication hybridization system 160 interacts with or forms a portion of a chat application, the presentation module 220 can cause presentation of a chat initiation or a chat notification. The presentation module 220 presents or causes presentation of information (e.g., visually displaying information on a screen, acoustic output, haptic feedback). This presentation of information includes the exchange of information between the client device 110 and the user 106.

The user may provide input to interact with the user interface, presented in whole or in part by the presentation module 220, in many possible manners, such as alphanumeric, point based (e.g., cursor), tactile, or other input (e.g., touch screen, tactile sensor, light sensor, infrared sensor, biometric sensor, microphone, gyroscope, accelerometer, or other sensors), and the like. The presentation module 220 provides many other user interfaces to facilitate user interactions with the client device 110 and include functionality described herein. The term "presenting" as used herein is intended to include communicating information or instructions to a particular device that is operable to perform presentation based on the communicated information or instructions.

The sensor module 230 provides various sensor input functionality. In some example embodiments, the sensor module 230 can include a position sensor and an orientation sensor to provide position and orientation data for the client device 110 to one or more of the communication module 210, the presentation module 220, the determination module 240, the management module 250, and the data module 260. For example, the position sensor and the orientation sensor can generate data or signals indicative of a position (e.g., height or elevation) and orientation (e.g., vertical or horizontal orientation) of the device. In some embodiments, the sensor module 230 does not include the position sensor and the orientation sensor, but rather receives input from a position sensor and an orientation sensor to provide position and orientation data to the above-referenced modules. For example, the sensor module 230 may receive sensor data indicative of a change in height, elevation, or relative elevation and orientation of the client device 110 from the position sensor and the orientation sensor located within the device external to the sensor module 230.

Although discussed as a position sensor and an orientation sensor, it should be understood that the client device 110 or the sensor module 230 can contain any number of sensors capable of providing data corresponding to a position and orientation of the client device 110. Further, the sensor module 230 can receive additional data corresponding to a position of the client device 110, such as relative position, change in position, horizontal position changes, repetitive motion (e.g., shaking), accelerometer data, or other physical sensor data for aspects of the position of the client device 110.

In some instances, the sensor module 230 can include a microphone, or be in communication with a microphone of the client device 110. In these embodiments, the microphone provides communication data (e.g., communication segments), voice activated instruction data (e.g., voice commands), or generally voice data indicative of the user 106 initiating speech into the microphone. The voice data received by the microphone can be used to cause user generated interrupts indicative of voice controls for the communications hybridization system 160. In some embodiments, the voice data can be used in conjunction with data from the position sensor and the orientation sensor to generate interrupts causing the communications hybridization system 160 to perform one or more operations discussed herein.

The determination module 240 can interpret data received from the sensor module 230 in order to determine a communication mode for presentation on the user interface of the client device 110 by the presentation module 220. For example, the determination module 240 can receive position data indicative of a change in vertical position of the client device 110, such as a user raising the client device 110 (e.g., mobile telephone) to the user's mouth to speak and voice data indicative of the user 106 initiating a communication segment (e.g., speaking into a microphone of the client device 110). The determination module 240 performs a determination of a desired communication mode from a set of communication modes. The communication modes include a text-based communication mode, a media based communication mode, an audio based communication mode, an audio message mode, combinations thereof, and other suitable communications modes.

In determining the desired communication mode from the set of communication modes, the determination module 240 can interpret sensor data based on predetermined thresholds. For example, the sensor module 230 can pass sensor data indicative of an increase in elevation for the client device 110. The determination module 240 may compare the increase in elevation with an elevation threshold, such that an increase in elevation above the elevation threshold causes the determination module 240 to generate an indication or signal to change a current communication mode to a desired communication mode.

By way of another example, the sensor module 230 can pass sensor data indicative of voice data. The determination module 240 may compare the voice data with a duration threshold, a volume threshold, or a predetermined set of commands, such that voice data above the volume threshold and exceeding the duration threshold causes the determination module 240 to generate an interrupt causing a change from a current communication mode to a desired communication mode. The determination module 240 can compare the voice data with the predetermined set of commands, such that where the voice data includes one or more of the predetermined set of commands, the determination module 240 generates an interrupt causing a change from the current communication mode to a desired communication mode commensurate with the one or more command contained in the voice data.

To further illustrate an example function of the determination module 240, the client device 110 can be initially set to a text based communication mode. The sensor module 230 receives sensor data indicative of an increase of elevation of more than twelve inches (i.e., greater than thirty centimeters). The sensor module 230 passes the sensor data to the determination module 240. The determination module 240 compares the sensor data to an elevation threshold having a value of six inches (i.e., about fifteen centimeters). Determining that the sensor data indicates a change in elevation greater than that of the elevation threshold, the determination module 240 generates a signal indicating that the communication mode should be changed from the text based communication mode to an audio based communication mode. That is, change in elevation causes the determination module 240 to determine that the user has raised the client device 110 to an elevated position in order to continue a current chat session by speaking into the device instead of entering text based messages. The determination module 240 passes a mode change indication to the management module 250 in order to cause the client device 110 to change to the desired communication mode.

In some example embodiments, the communication hybridization system 160 can transition from full duplex voice communication to a voice-based communication segment (e.g., voice note or audio note) or a text-based communication segment (e.g., a text message) by the determination module 240 receiving sensor data indicative of a change in lateral position (e.g., the user 106 moving the client device 110 from being positioned proximate to the user's ear to being positioned in front of the user's mouth/face indicating that the user may not be expecting to listen to the other party at the current time), a change in orientation, a voice command, an initiation of a voice-based communication segment, or combinations thereof.

Although described with reference to a predetermined threshold, in some example embodiments, a threshold for changing between communication modes can be manually entered or adjusted by the user 106 of the client device 110. Similarly, the threshold for changing between communication modes can be a learning threshold, such that over time, the determination module 240 can determine values, appropriate to the user 106 and associated therewith, which indicate a desire of the user to change between communication modes. Further, the predetermined set of voice commands can be input by the user 106 of the client device 110. In some instances, the predetermined set of voice commands can include a command variability element, such that over time, the determination module 240 can acquire vocabulary, accents, abbreviations, intonation, or other speech patterns appropriate to the user 106 of the client device 110.

The management module 250 receives the mode change indication from the determination module 240 and changes between communication modes. For example, based on receipt of the mode change indication, the management module 250 generates a mode interrupt within the client device 110. The mode interrupt causes a processor of the client device 110 to change between communication modes, such as from the audio based communication mode to the text based communication mode. The mode interrupt also causes the presentation module 220 to modify or change the user interface presented to the user on the client device 110. For example, the mode interrupt can cause the presentation module 220 to change a portion of the user interface from the text based communication mode to the audio based communication mode, by removing a virtual keyboard from the user interface and causing presentation of a communication segment icon (e.g., a microphone icon) or a user selectable icon. The communication segment icon can indicate the audio based communication mode (e.g., full duplex communication), while the user selectable icon enables the user to transmit audio communication while the selectable icon is engaged and receive audio communication while the selectable icon is not engaged (e.g., half duplex communication). In some instances, the communication segment icon and the user selectable icon are the same icon, selectable to generate and transmit communication among users.

The data module 260 provides various data storage functionality. For example, the data module 260 can temporarily store or cache communication data prior to transmission of the data or prior to the user viewing the communication data. Where the data module 260 stores the communication data prior to transmission, a storage medium associated with the data module 260 stores the communication data while the user generates a message for transmission. The data module 260 dynamically modifies the communication data to add additional communication data generated by the user.

The data module 260 receives communication data from the communication module 210 for storage in a storage medium, such as a non-transitory machine-readable storage medium, memory, flash memory, network storage (e.g., cloud storage), or other suitable storage media. The communication data is stored on the storage medium for a predetermined period of time. A duration of the predetermined period of time may be set by the client device 110, the user of the client device 110, the communication mode, the communication module 210, or any other suitable source capable of determining or storing a value indicative of the duration within the data module 260. The communication data can also be stored on the storage medium until reception of a predetermined indication, such as an indication of the user viewing the communication data or transmitting the communication data.

Figure 3:
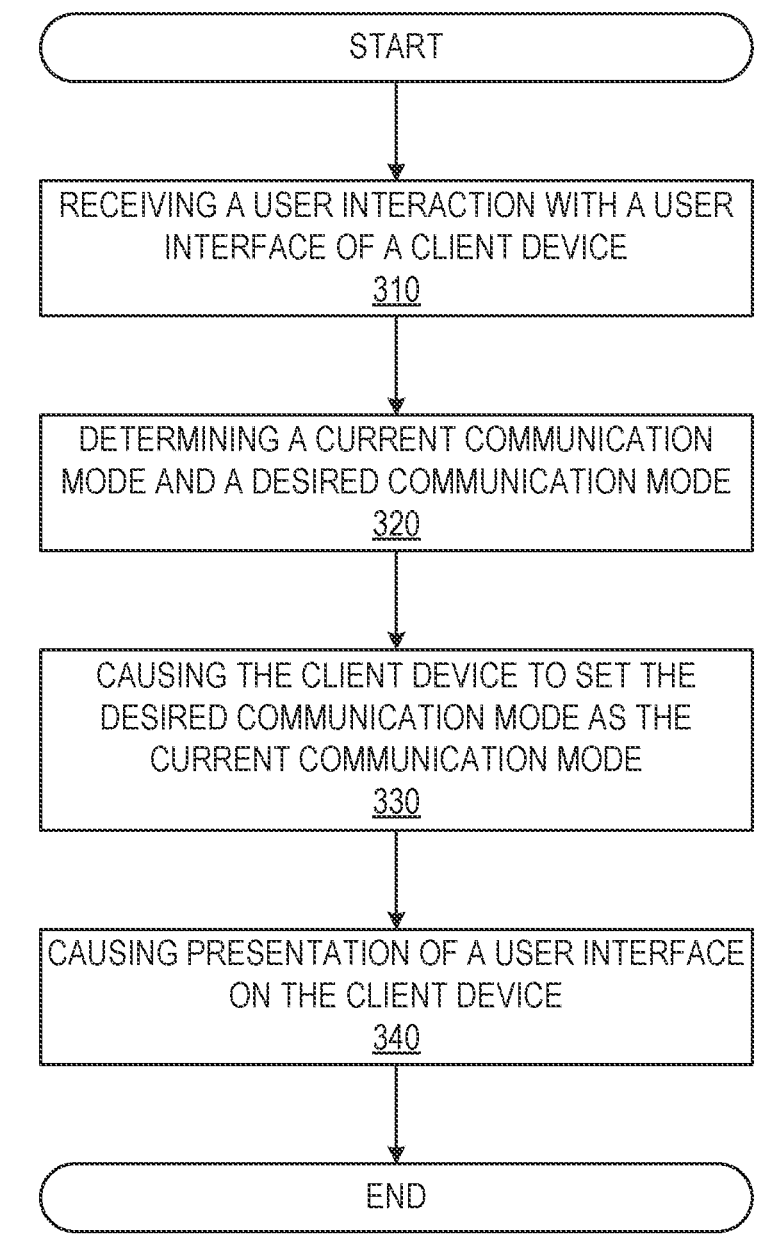
FIG. 3 is a flow diagram illustrating an example method for hybridizing communications using gestures in association with a user interface, according to some example embodiments.

FIG. 3 depicts a flow diagram illustrating an example method 300 for hybridizing communications using gestures in association with a user interface. The operations of method 300 may be performed by components of the communication hybridization system 160, and are so described below for purposes of illustration.

In operation 310, the communication module 210, the presentation module 220, the sensor module 230, or a combination thereof receive a user interaction with a user interface of the client device 110. An example of the operation 310 is shown in FIGS. 6 and 7A-7C. The user interaction indicates a desired communication mode. For example, the user interaction can be a touch-based gesture such as a partial swipe or a full swipe. The partial swipe is indicative of the user 106 touching a touch screen or manipulating a pointer across a portion of a screen presenting the user interface. The full swipe is indicative of a swipe across an entire measurement of the screen (e.g., the entire length or width). The swipe can be centered on an interactive user interface element, such as a text input box. In some example embodiments, the swipe can be passed to modules, or a processor of the client device 110, in the form of a user interrupt.

In operation 320, the determination module 240 determines a current communication mode (e.g., text based communication) and generates an indication of a change to the desired communication mode (e.g., audio based communication). The determination module 240 passes the indication to the management module 250. The notification may be presented within the user interface at the client device 110. In some embodiments, the notification is presented as a set of text identifying the communication mode or a method of inputting communication data into the communication mode. The notification may be presented as an overlay, embedded text, a temporary window which closes after a predetermined period of time, or any other suitable notification. Where the notification is presented as embedded text along with a portion of communications data (e.g., a portion of a message sent by another client device), the embedded text of the notification may be presented as distinct from the communications data. In some embodiments, where the communications data is a portion of text, the embedded text of the notification is presented as one or more of a different text font, a different text size, a differing color, or a different position than that of the text of the communications data. For example, the notification text may be presented as a portion of text in a font smaller than that of the communication data and positioned a distance away from the communication data.

The determination module 240 determines the desired communication mode based on the user interaction received in the operation 310. In some embodiments, predetermined actions are associated with differing communication methods of a set of communication methods. For example, an upward touch-based gesture (e.g., an upward swipe) or a change in position of the client device 110 in an upward motion relative to the orientation of the touchscreen of the client device 110 may indicate the desired communication mode is voice based. In some embodiments a partial touch-based gesture (e.g., a swipe), across a portion of the touchscreen of the client device 110, represents a first communication mode. A full touch-based gesture (e.g., a full swipe) across the touchscreen of the client device 110 in a predetermined direction, represents a second communication mode. In some embodiments, the first communication mode is a voice-to-text communication mode and the second communication mode is a full duplex telephone call. The voice based communication mode may enable voice-to-text communication, voice recordings, a full duplex or half duplex voice communication mode (e.g., a telephone call, VoIP call, a video call) or any other suitable voice-based communication. Although discussed with respect to voice based communication, the communication modes may include video based communication, text based communication, or any other suitable communication mode by which the client device 110 is capable of receiving user input representative of communication data and interpreting the communication data for transmission to another client device.

In operation 330, the management module 250 causes the communication hybridization system 160 or a communication application on the client device 110 to set the communication mode to the desired communication mode determined by the determination module 240. For example, the management module 250 can set the communication mode by changing a mode of operation of a communication application on the client device 110. In some embodiments, the change to the mode of operation causes the client device 110 to initialize an input field or an input device associated or part of the client device. Initializing the input field causes presentation of an input field (e.g., a text entry field or a user interface element) capable of receiving or accessing communications data. For example the input field may be a text entry field configured to receive communications data in the form text data input from a physical or virtual keyboard passing input to the communication hybridization system 160. Initializing the input device may cause the client device 110 to initiate one or more communication devices associated with or part of the client device 110. For example, the input device may be a camera initialized for a video chat session, a microphone initialized for a voice recording or voice-to-text operation, or a microphone and speaker initialized in conjunction with circuitry of the client device 110 to place a telephone call.

In operation 340, the presentation module 220 causes presentation of a user interface on the client device 110. The user interface presented by the presentation module 220 is indicative of the desired communication mode. For example, where the desired communication mode is an audio based communication mode, the presentation module 220 can cause the user interface to include an interactive user interface element such as a communication segment icon (e.g., an audio note icon or a microphone icon). The user 106 interacts with the communication segment icon to generate a communication segment (e.g., an audio note or voicemail note). In some embodiments, the modules can translate a voice-based communication segment into a text-based communication segment. For example, presentation module 220 can process the voice-based communication segment through a set of voice-to-text operations and render the voice-based communication segment on the user interface of the client device 110 as a set of text (e.g., a text-based communication segment, text message, text push notification).

Figure 4:
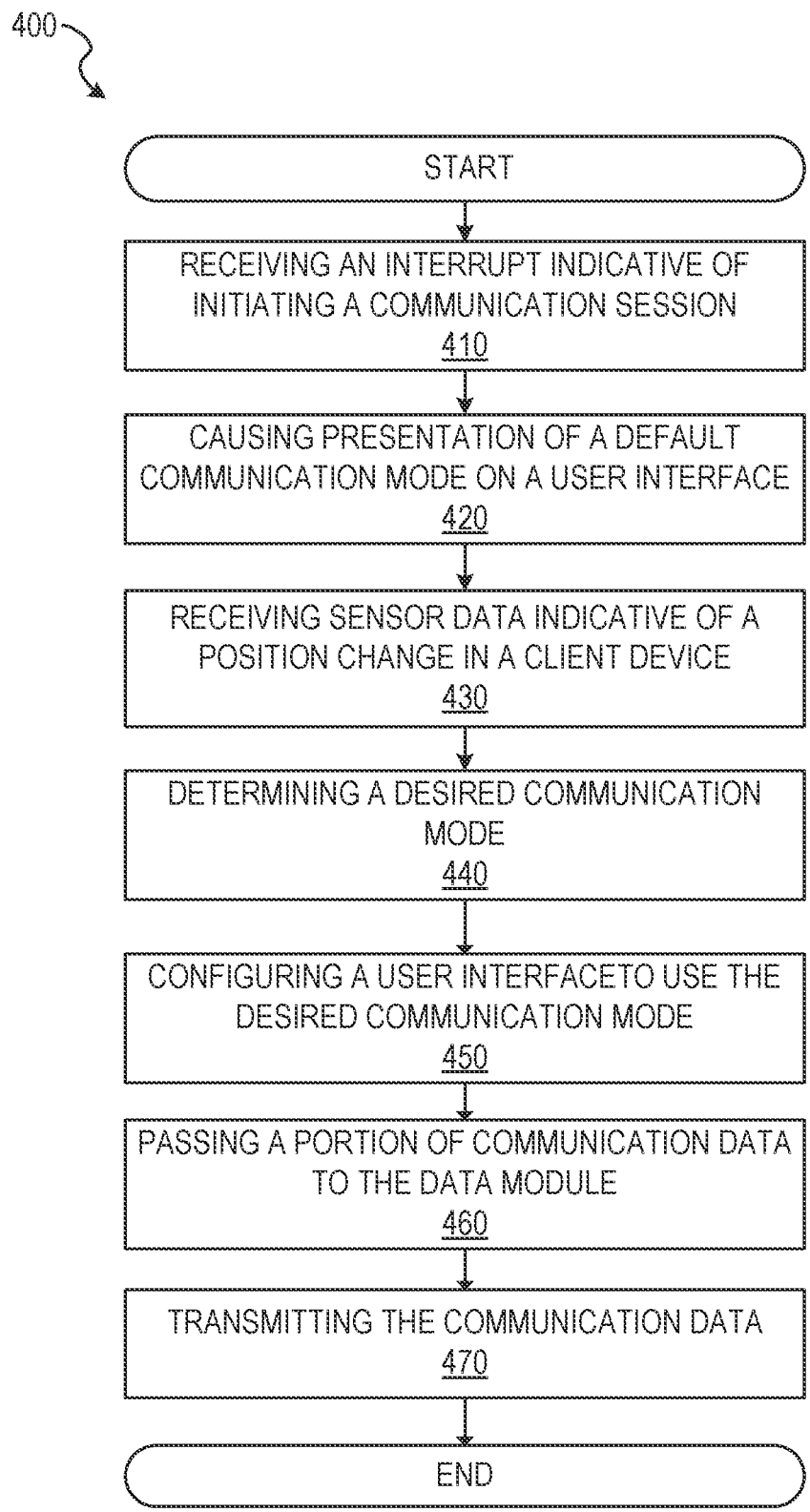
FIG. 4 is a flow diagram illustrating an example method for hybridizing communications, according to some example embodiments.

FIG. 4 illustrates a flow diagram illustrating an example method 400 for hybridizing communication types for transmitting a message. The operations of method 400 may be performed by components of the communication hybridization system 160, and are so described below for purposes of illustration. In some embodiments, operations of the method 400 may use one or more operation of the method 300, be performed as sub-operations of one or more operations of the method 300, or be initiated based on one or more operations of the method 300.

In operation 410, the communication module 210 of the communication hybridization system 160 on the client device 110 receives an interrupt indicative of initiating a communication session (e.g., a chat or a telephone call). For example, the communication module 210 can receive an interrupt indicative of a chat initiation within a communication application on the client device 110. The chat initiation is indicative of a creation of a new communication session among two or more users or resuming an existing communication session among two or more users. The communication application comprises processor executable instructions configured to interact with the communication hybridization system 160. For example, the processor executable instructions of the communication application can comprise at least a portion of the communication hybridization system 160. In some example embodiments, the interrupt initiating communication can be preceded by a user initiated interrupt causing the client device 110 to open the communication application.

In operation 420, the presentation module 220 causes presentation of a default communication mode on the user interface of the client device 110. For example, upon receiving the interrupt initiating the communication session, the presentation module 220 can present a user interface corresponding to the text based communication mode configured to receive and transmit text based messages. The text based communication mode is presented such that a portion of the user interface includes a virtual keyboard capable of receiving user input to generate text based messages.

In some embodiments, the default communication mode is a predetermined communication mode. The predetermined communication mode may be set by the user of the client device 110 as a setting within the user interface of the client device. In some instances, the default communication mode may be selected in response to communications data received from another client device. The determination module 240 determines a communication type (e.g., voice based communication, text based communication, video based communication) for communications data received at the client device 110. In response to the determination module 240 determining the communication type of the received communications data, the determination module 240 identifies a communication mode having a communications type which matches or is associated with the communications type of the received communications data. The communication mode selected by the determination module 240 is capable of receiving input associated with the communication type for the received communications data. The presentation module 220 presents the default communication mode as the communication mode selected as having a communications type matching the communications type of the received communications data.

In operation 430, the sensor module 230 receives sensor data indicative of a position change in the client device 110. For example, the sensor module 230 can receive a first set of sensor data indicative of a first position change, such as an increase in an elevation of the client device 110 from a lowered position to a position proximate to the user's 106 ear. By way of further illustration, the sensor module 230 can receive the first set of sensor data indicative of a first orientation change. The first orientation change can be a change in the orientation of the client device 110 from a vertical or horizontal orientation to a diagonal orientation, for example. The diagonal orientation has an angle indicative of the user 106 positioning the client device 110 in an orientation suitable to simultaneously speak into and listen to output of the client device 110. The sensor module 230 passes, transmits, or otherwise enables access of the sensor data to the determination module 240.

One example of an orientation change can be rotating the client device 110 to a speakerphone position. In this position, the user 106 rotates an input (e.g., microphone) of the client device 110 from a first position to a second position, placing the input closer to a mouth of the user (e.g., an audio output source). For example, where an output speaker (e.g., earpiece) is positioned proximate to a first end of the client device 110 and the microphone is positioned proximate to a second end of the client device 110, the orientation change can be a rotation of approximately 180°. The rotation, in this example, can position the input closer to the user's 106 mouth. The rotation can be vertical (e.g., turning the client device 110 upside down), horizontal (e.g., turning the microphone toward the user and the output speaker away from the user), or combinations vertical and horizontal rotation.

In operation 440, based on the sensor data received from the sensor module 230, the determination module 240 can determine a desired communication mode for the client device 110 to receive a message generated by the user 106 in a communication mode compatible with the manner in which the user 106 attempts to enter the message. The determination module 240 may interpret the sensor data based on predetermined thresholds. In some instances, the determination module 240 identifies a value within the sensor data, such as distance traveled (e.g., vertical, horizontal, diagonal) and compares the value to a predetermined distance threshold value. The value may be selected from a set of values, where each value represents a quantity of an aspect capable of being measured by one or more sensors of the client device 110. Where the sensor data value exceeds the predetermined distance threshold value, the determination module 240 can determine a communication mode, from a set of communication modes, which is associated with a determination of exceeding the predetermined distance threshold value. For example, the audio based communication mode can be associated with a determination that the client device 110 changed vertical position in an amount greater than a predetermined threshold of twelve inches (i.e., greater than thirty centimeters), suggesting that the user 106 raised the client device 110 from a position proximate to the user's 106 waist or stomach to a position proximate to the user's 106 ear. By way of another example, the audio message mode can be associated with a determination that the client device 110 was rotated to the speakerphone position, described above. The determination of the speakerphone position suggests that the user 106 rotated the output speaker away from an ear of the user 106.

In some embodiments, the determination module 240 receives a plurality of values (e.g., a change in a plurality of quantities of measured aspects). The determination module 240 identifies a primary value used as the sensor data value for comparison to a predetermined threshold. The determination module 240 may determine the primary value based on an amount of the change among the quantities. The primary value may be determined as the value with the greatest change among the plurality of values, the value with a change in quantity which has a predetermined association with a communication mode, or other suitable methods of identification. For example, where the sensors of the client device 110 detect a change in vertical position (e.g., the client device 110 is being lifted) and a change in orientation (e.g., the client device 110 is being rotated about a vertical axis), the determination module 240 may select the audio communication mode based on an association between the change in vertical position and the audio communication mode or the change in vertical position having a greater difference between starting and ending quantities than the difference determined for the change in orientation.

Once the determination module 240 has determined a desired communication mode from the set of communication modes, the determination module 240 passes a mode change indication to other modules to enact a change in the communication mode, the user interface, and the communication application. For example, the determination module 240 can pass the mode change indication to the management module 250 to change between the communication modes, and to the presentation module 220 to change at least a portion of the user interface to indicate a change to the desired communication mode.

In some example embodiments, the determination module 240 can also receive a mode indication from the second client device, with which the client device 110 is attempting to communicate. When the determination module 240 receives the mode indication from the second client device, the determination module 240 bases the determination of the desired communication mode (e.g., a compatible communication mode) on a combination of the sensor data and the mode indication. The compatible communication mode is a communication mode which is configured to receive and transmit communications data in a format which a suggested communication mode of the mode indication may interpret and is configured to be operated in accordance with the desired communication mode determined based on the sensor data. For example, the determination module 240 can determine due to the sensor data that the desired mode is the audio based communication mode. The determination module 240 then determines whether a mode indication has been received from the second client device which includes a suggested communication mode.

If the mode indication has been received and the suggested communication mode within the mode indication contraindicates the desired mode, the determination module 240 determines a second desired mode (e.g., the compatible communication mode). For example, the determination module 240 may have determined that the audio based communication mode is the desired mode. However, the mode indication of the second client device has indicated the second client device is unavailable or unable to communicate using the audio based communication mode (e.g., full duplex communication, a telephone call, or half duplex communication). In this example, the determination module 240 can determine that the audio message mode is suitable or the desired mode. The determination module 240 thereby enables the client device 110 to be used in its current position and orientation for communication, and enables the user 106 to complete transmission of an audio message to the second client device.

In operation 450, the determination module 240 passes the mode change indication to the management module 250 to change the communication mode. The management module 250 configures the communication hybridization system 160 and the communication application to receive and transmit communications using the desired communication mode. For example, the management module 250 can pass the mode change indication to the presentation module 220, causing the presentation module 220 to present a user interface corresponding to the desired communication mode on the client device 110.

In operation 460, based on the sensor data and the determination module 240, the communication module 210 receives the communication data from the user 106 through an input of the client device 110 and passes at least a portion of the communication data to the data module 260. By way of illustration, the data module 260 can receive communication data indicative of a text based message, a media message, or an audio message to be transmitted by the communication module 210. The data module 260 receives and stores the communication message prior to transmission on a storage medium (e.g., memory, non-transitory machine-readable storage medium, optical storage medium, etc.) or prior to viewing communication data received by the communication module 210 from the second client device.

The data module 260 modifies the communication data to enable the user 106 to generate a message and save the message in the event of an interruption. For example, where the user 106 is generating an audio message, and receives an indication that the second client device is available for audio based communication (e.g., telephone call), the data module 260 can retain a state of the audio message and enable the user 106 to continue recording the audio message after terminating the audio based communication with the second client device.

In some example embodiments, the method 400 can further include operation 470, in which the communication module 210 receives the communication data from the data module 260, indicative of a completed message ready for transmission to the second client device. The communication module 210 then transmits the communication data to the second client device.

The communication module 210 can also process the communication data to change the communication mode employed by the communication data. For example, where the communication data is an audio message, the communication module 210 can process the communication data for transmission as a text based communication. The communication module 210 employs processor executable instructions to convert communication data, such as voice-to-text operations, text-to-voice operations, and other suitable communication data conversion processes and operations.

The communication module 210 can transmit the communication data or transmit converted communication data independent of an indication of a selected communication mode for the second client device. In some example embodiments, the communication module 210 can determine whether to transmit the communication data or converted communication data based on the mode indication received from the second client device.

Figure 5:
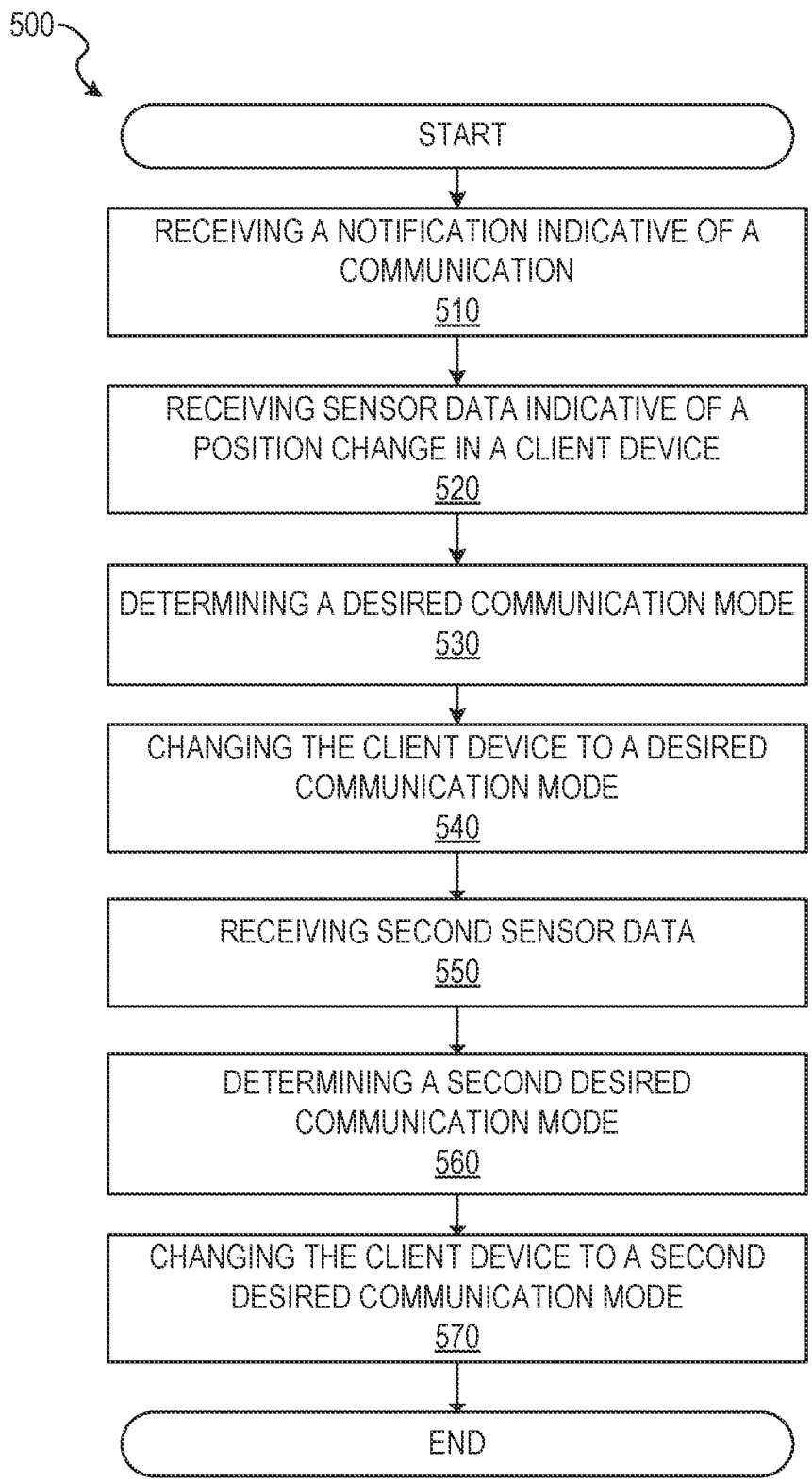
FIG. 5 is a flow diagram illustrating an example method for hybridizing communication types for engaging in a chat session, according to some example embodiments.

FIG. 5 depicts a flow diagram illustrating an example method 500 for hybridizing communication types for engaging in a chat session, based on a position of the client device 110. The operations of method 500 may be performed by components of the communication hybridization system 160, and are so described below for purposes of illustration. In various embodiments, operations of the method 500 may be performed using one or more operations of the methods 300 and 400, may be sub-operations of operations described with respect to the methods 300 and 400, or be initiated based on one or more operations of the methods 300 and 400.

Figure 8:
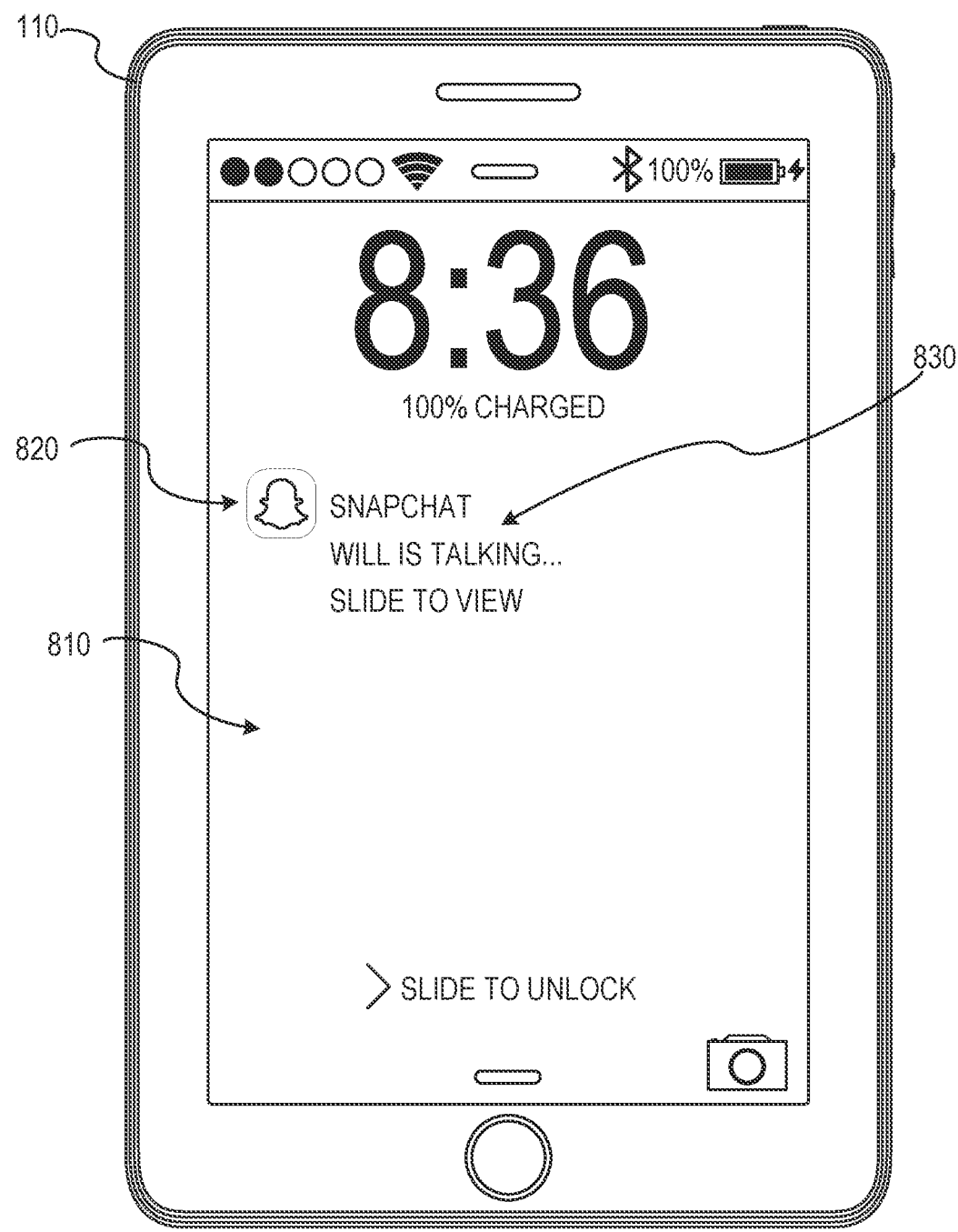
FIGS. 8-14 illustrate example user interfaces configured to receive a combination of text and voice notes, according to some example embodiments.

In operation 510, as shown in FIG. 8, the communication module 210 receives a notification indicative of a communication between the client device 110 and a second client device. For example, the communication module 210 can receive a notification indicative of a chat initiation with a second client device and chat data. The chat data can comprise audio data, text data, image data, or other media.

In operation 520, the sensor module 230 receives sensor data indicative of a position change in the client device 110. For example, the sensor module 230 can receive first sensor data indicative of a first position or orientation change in the client device 110. During the operation 520, the sensor module 230 can receive sensor data similar that of operation 430.

In operation 530, based on the sensor data and a communication type of chat data received from the second device, the determination module 240 determines a desired communication mode for the client device 110 to receive a message transmitted from the second device. The determination module 240 determines the desired communication mode based on a data type of the communication data received from the second device by matching the communication mode with the data type. For example, the determination module 240 can determine the desired communication mode to be the text based communication mode when receiving messages composed of text data or audio files where a portion of the audio file has been converted to text.

In operation 540, based on the first sensor data and the determination of the desired communication mode by the determination module 240, the management module 250 generates a first interrupt configuring the client device 110 to set or change a default communication mode to that of the desired communication mode. For example, the management module 250 can cause the client device 110 to enter into an audio based communication session with the second device over a communication network. The management module 250 can change or set the communication mode in operation 540 similarly to operation 450.

In operation 550, the sensor module 230 receives second sensor data indicative of a second position change of the client device 110. In some example embodiments, the sensor module 230 can receive second sensor data for a position change and an orientation change in the client device 110. The sensor module 230 can receive the second sensor data in operation 550 similar to that of operation 520 and 430. In some embodiments, the second position change is received after the communication hybridization system 160 receives communication data through an input of the client device 110.

In operation 560, based on the second sensor data, the determination module 240 determines a second desired communication mode for the client device 110 to continue receiving the communication data from the second device without engaging in a bilateral chat session. The determination module 240 can determine the desired communication mode based on the second sensor data similar operations 440 and 530.

In operation 570, based on the second sensor data and the determination of the desired communication mode by the determination module 240, the management module 250 generates a second interrupt configuring the client device 110 to set or change the desired communication mode to that of the second desired communication mode. In response to the change to the second desired communication mode, the management module 250 causes the communication module 210 to terminate the voice chat on the part of the client device 110. As referenced with respect to the operation 440, as part of operation 570, the client device 110 can transmit a mode indication to the second device indicating the termination of the voice chat. Where the mode indication has been transmitted, the client device 110 may still receive the voice chat, or a voice-to-text version of the voice chat. The communication data indicative of the voice chat or the voice-to-text version of the voice chat, is retained for later consumption by the user 106 of the client device 110.

In some embodiments, the client device 110 receives first communications data in a first format (e.g., text data) via a first input. The first communication data represents a portion of a message received via an input of the client device 110 from a user entering in the communications data. For example, the first communications data may be in a text format entered by the user of the client device 110 on a virtual keyboard presented on a touchscreen of the client device 110. In some instances, the client device 110 receives the first communication data after receiving the first sensor data in operation 520. The sensor module 230 may receive the second sensor data in operation 550, after the client device receives the first communication data. The second sensor data may represent a change in position or orientation of the client device 110. The determination module 240 may determine the second desired communication mode in operation 560. This second change in position may represent a selection (e.g., by movement of the client device 110) of a new communication mode to complete the portion of the message represented by the first communications data. In some embodiments, the second desired communication mode receives communication data in a second format (e.g., audio data). In some instances, after changing the client device to the second desired communication mode in operation 570, the client device 110 receives second communications data representing a continuation of the message represented by the first communications data. The communication module 210 receives the second communications data in the second format via a second input device (e.g., a microphone instead of a keyboard) of the client device 110. The second desired communication mode converts the second communications data from the second format to the first format. In some embodiments, the second desired communication mode appends the second communications data, in the first format, to the first communications data for inclusion in a single message to be transmitted to another client device.

By way of illustration, in FIGS. 6-13, example user interface screens are presented for an example embodiment of the operations of methods 300, 400, and 500. Although FIGS. 6-13 depict specific example user interfaces and user interface elements, these are merely non-limiting examples, many other alternate user interfaces and user interface elements can be generated by the presentation module 220 and caused to be presented to the user. It will be noted that alternative presentation of the displays of FIGS. 6-13 can include additional information, graphics, options, and so forth. Alternatively, other presentations can include less information, or provide abridged information for easy use by the user.

Figure 6:
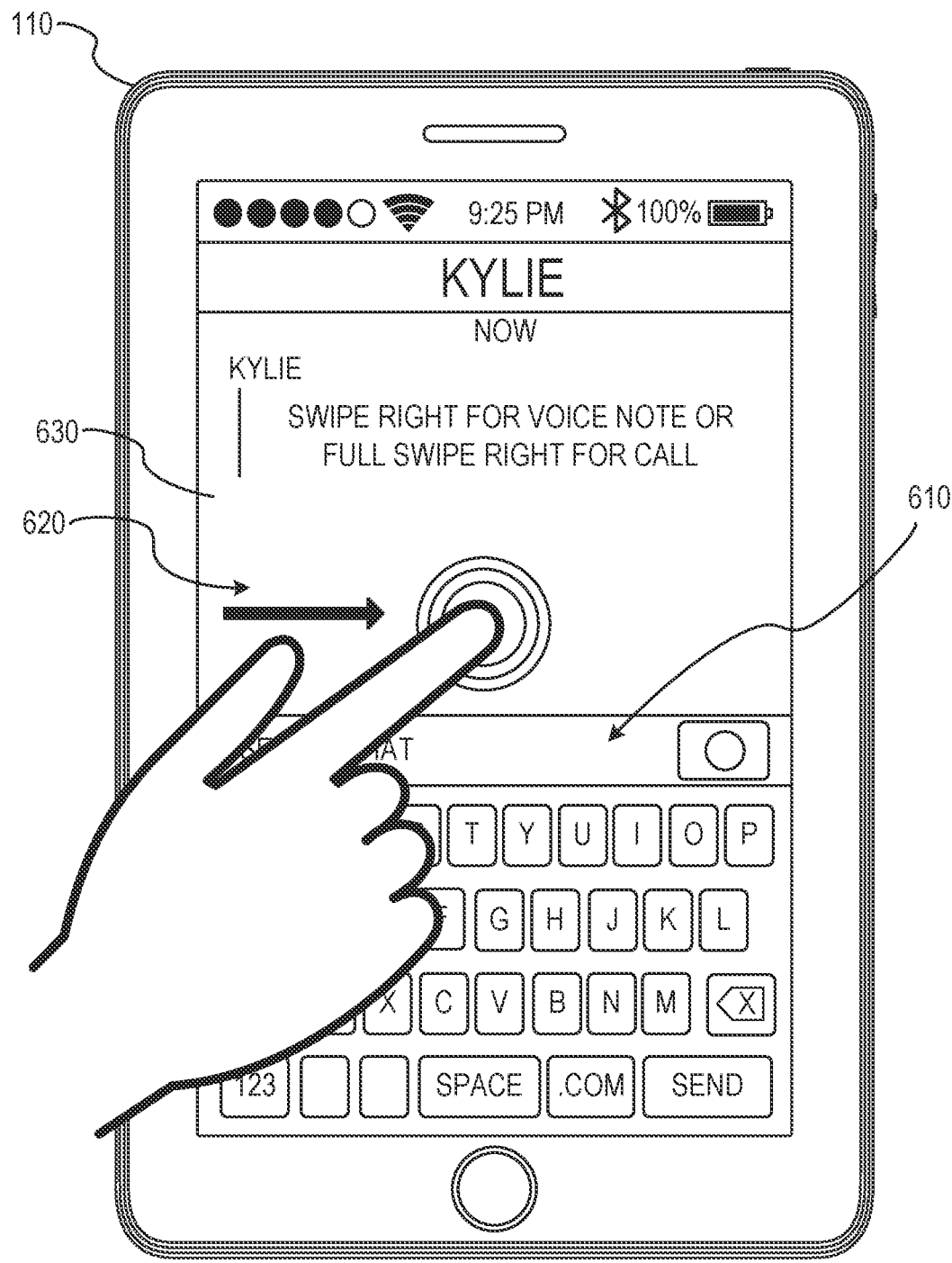
FIG. 6 illustrates an example user interaction to cause a change in a communication mode, according to some example embodiments.

FIG. 6 illustrates a user interaction, as referenced in operation 310 and a change in default communication mode referenced in operation 320. The client device 110 can initially present a text input box 610 by the presentation module 220. The user 106 can perform and the client device 110 may receive a partial swipe 620 on the text input box 610 or proximate thereto to initiate a communication segment in the form of a voice note or audio note. For example, the user 106 can place a finger on a touch-screen 630 of the client device 110 on a left side of the text input box 610 and drag the finger part way across the screen 630 (e.g., to approximately a middle area of the text input box) to signal a desired change in the communication mode from a text based communication mode to an audio message mode. Upon receiving the partial swipe 620, the communication hybridization system 160 can change the communication mode to enable the user 106 to generate the communication segment, as discussed in operations 320-340.

In some embodiments, the user 106 can perform and the communication hybridization system 160 may receive first and second interactions to cause a change in the communication mode. For example, the user 106 can perform the partial swipe 620, as a first interaction, on the text input box 610 to initiate text-based communication segment by initiating the communication segment in the form of the voice note or audio note. In some instances the first interaction can cause a change in the communication mode. In some embodiments, the first interaction can cause an interrupt, causing the client device 110 to wait for a second interaction. The user 106 can then perform and the client device 110 may receive the second interaction (e.g., speaking into a microphone of the client device 110) to cause the change in communication mode or cause a second change in communication mode.

The user 106 can also perform and the client device 110 can receive a full swipe on the text input box to initiate a voice call. For instance, the user 106 can place a finger on the touch-screen of the client device 110 proximate to the left side of the text input box 610 and drag the finger across a length of the text input box 610 (e.g., from the left side of the text input box to a right side of the text input box). The full swipe can indicate a desired change in the communication mode from a text based communication mode to an audio based communication mode (e.g., a voice call). Upon receiving the full swipe, the communication hybridization system 160 changes the communication mode to enable the user 106 to engage in communications using the audio based communication mode, in a manner similar to operations 320-340.

Figure 7A:
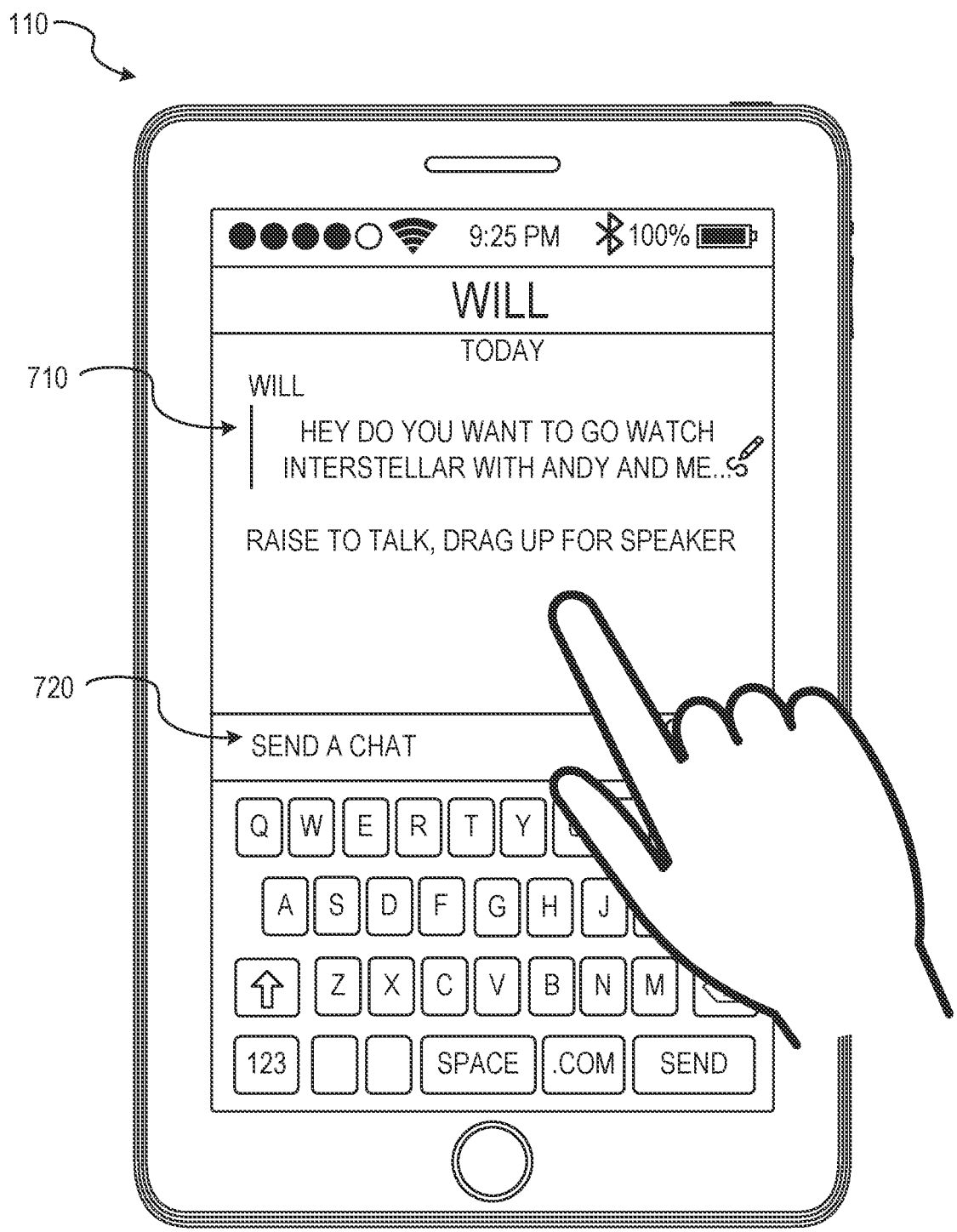
FIGS. 7A-7C illustrate an example user interaction to cause a change in a communication mode, according to some example embodiments.
Figure 7B:
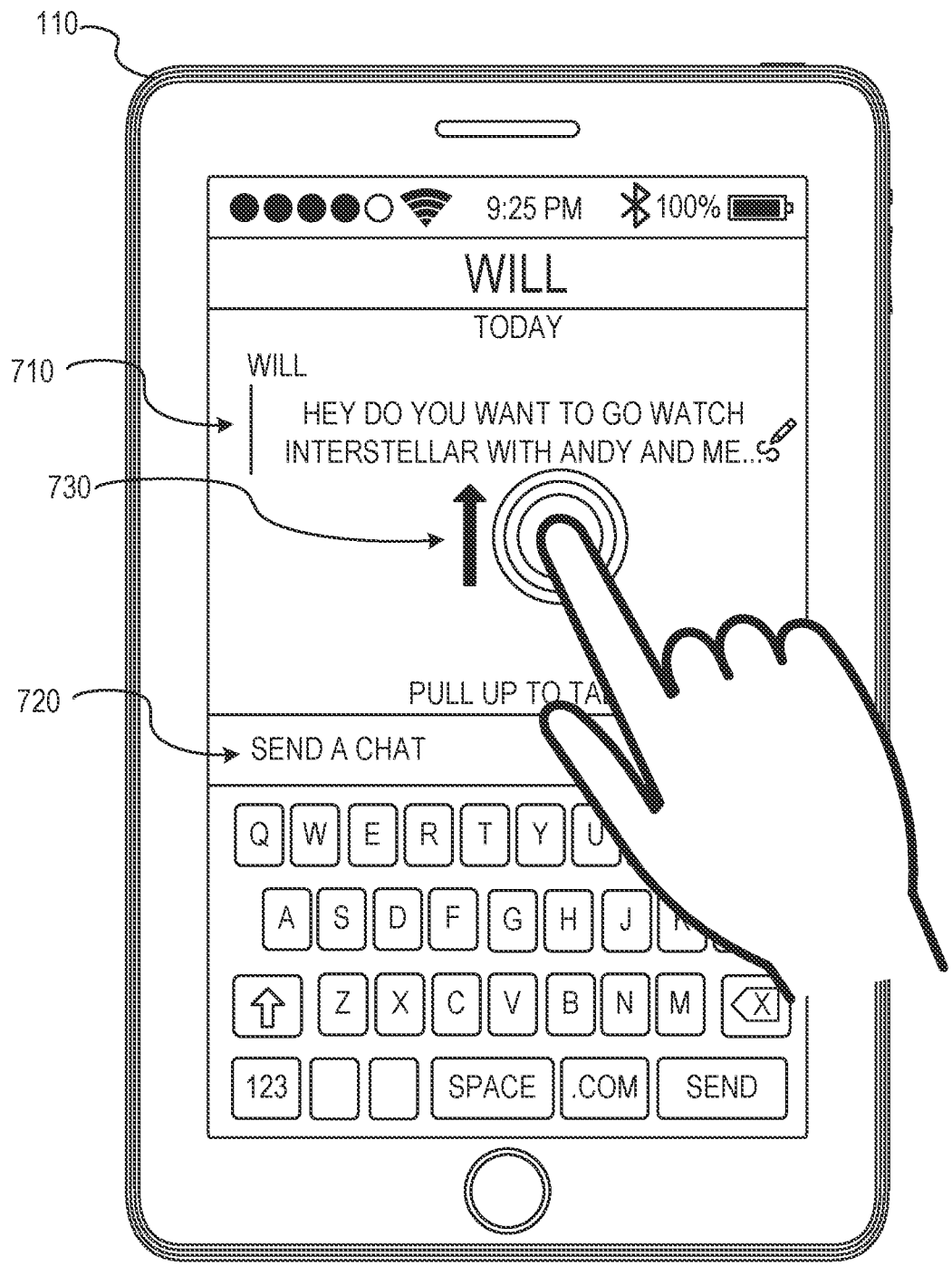
Figure 7C:
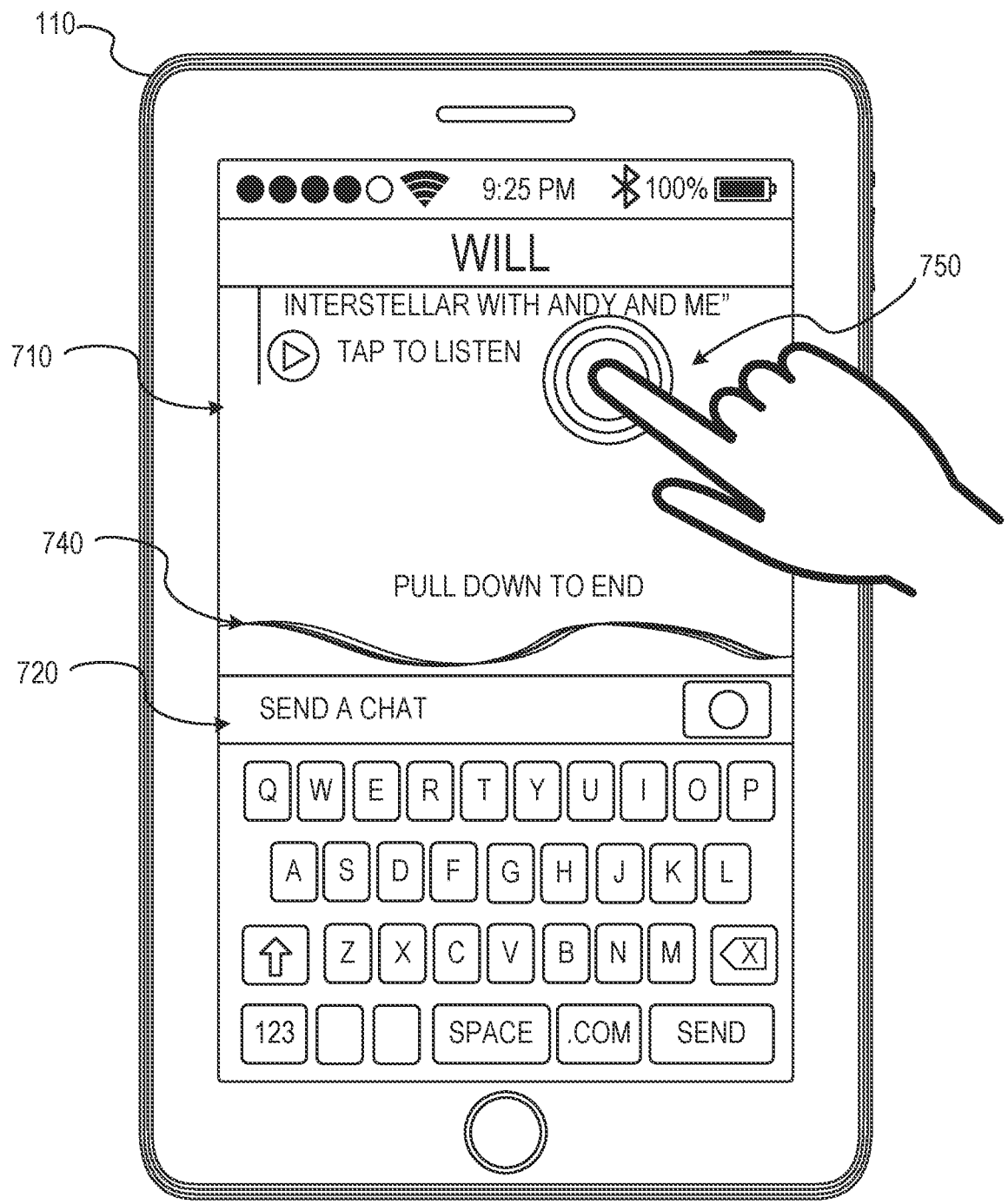

FIGS. 7A-7C illustrate an example embodiment of a user interaction, as referenced in operation 310 and a change in default communication mode referenced in operation 320. The presentation module 220 can initially present a user interface including the default communication mode. As shown in FIG. 7A the default communication mode has a chat window 710 and a text input box 720. The user 106 interacts with the user interface such that the client device 110 generates an interrupt signaling a switch in communication modes. In some embodiments, the interrupt is generated in response to receiving a user interaction of swiping up 730 from a position in the chat window 710 or the text input box 720, as shown in FIG. 7B. The user interaction of swiping up 730 can also initiate the client device 110 to generate and present a user interface screen by the presentation module 220, in addition to cause a change in the default communication mode (e.g., operations 320 and 330). For example, as shown in FIG. 7C, the presentation module 220 can generate a waveform 740 indicative of a change in the communication mode from a text based communication mode to a voice note mode (e.g., the audio message mode). The presentation module 220 can present the waveform to indicate to the user 106 that the client device 110 has changed the communication mode (e.g., entered the audio message mode).

In some example embodiments, as shown in FIG. 7C, the user interaction of swiping up can be held 750 (e.g., the finger can remain at the end of the swipe) during a time period in which the voice note is recorded. For example, the user 106 swipes up causing the client device 110 to initiate one or more operations to reveal the waveform. The user 106 maintains a finger position 750 in order to record the voice message. The user 106 may then release the finger position (e.g., remove the finger from contact with the touch screen of the client device 110) to end recording of the voice message, causing the client device 110 to initiate one or more operations to terminate capture of the recording and prepare for transmission of the recording as the voice message. In some instances, releasing the finger position can cause the client device 110 to generate an interrupt causing the client device 110 to switch back to a previous communication mode.

In other embodiments, the user 106 can swipe up to change the communication mode without maintaining the position of the end of the swipe. For example, the user 106 can swipe up to change to the audio message mode, releasing the cursor or pointer at the end of the swipe. The user 106 can then swipe down in the chat window to exit the audio message mode and return to the previous communication mode or switch to a different communication mode.

Although described with relation to swiping up, swiping down, and swiping right, it should be understood that the communication mode can be changed by other user interactions. For example, a interrupt can be generated in response to shaking of the client device 110; changing orientation of the client device 110; changing position of the client device 110; interacting with one or more buttons, switches, or other tactile input devices on the client device 110; speaking into a microphone of the client device 110; combinations thereof; or any other suitable user interaction capable of generating an interrupt to cause a change in the communication mode of the device.

FIG. 8 depicts a user interface screen 810 for portions of the operation 510. In FIG. 8, the user 106 can receive a push notification 820 indicative of the second device transmitting a voice note 830 (e.g., a message containing voice-to-text message data).

Figure 9:
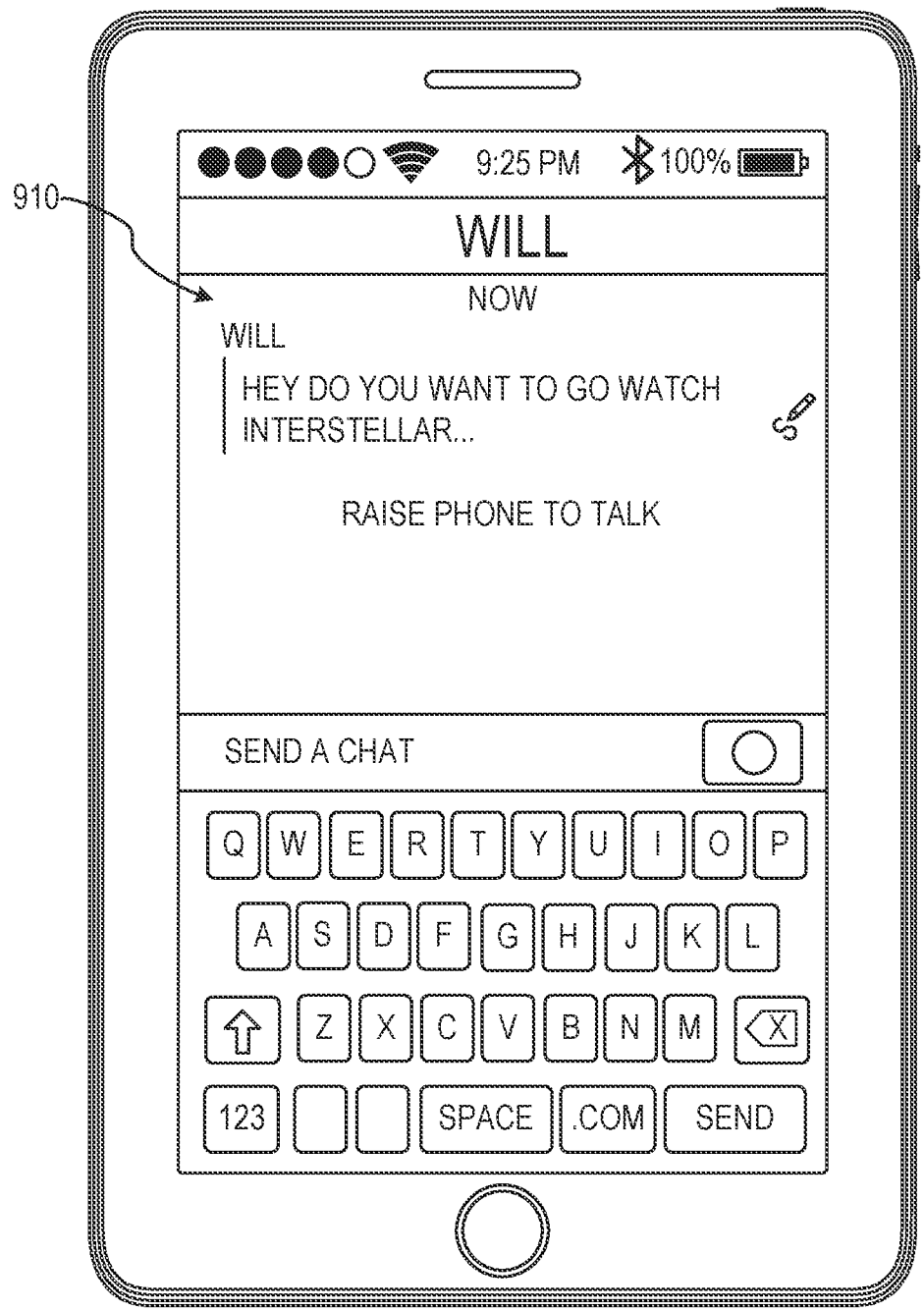
Figure 10:
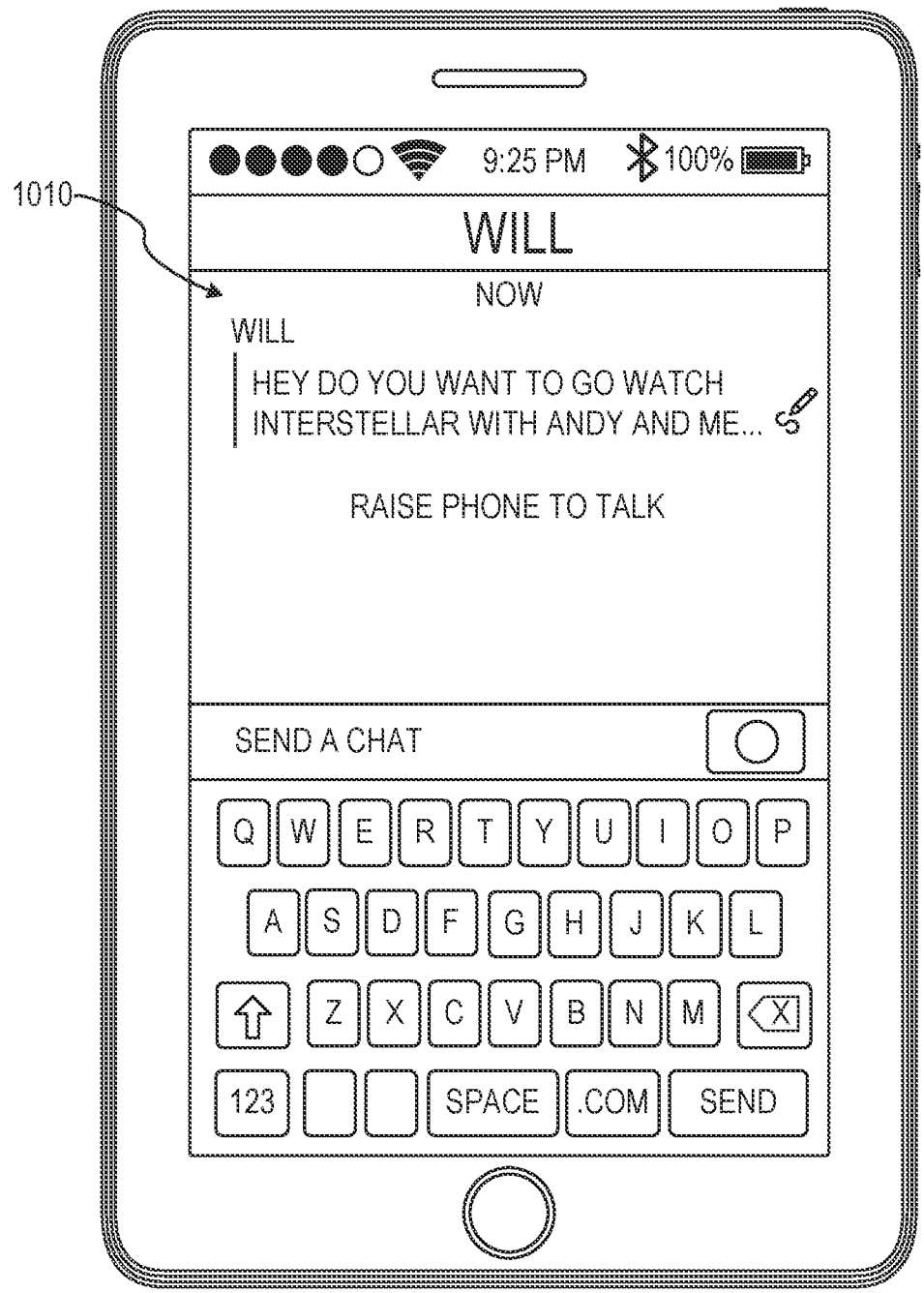
Figure 11:
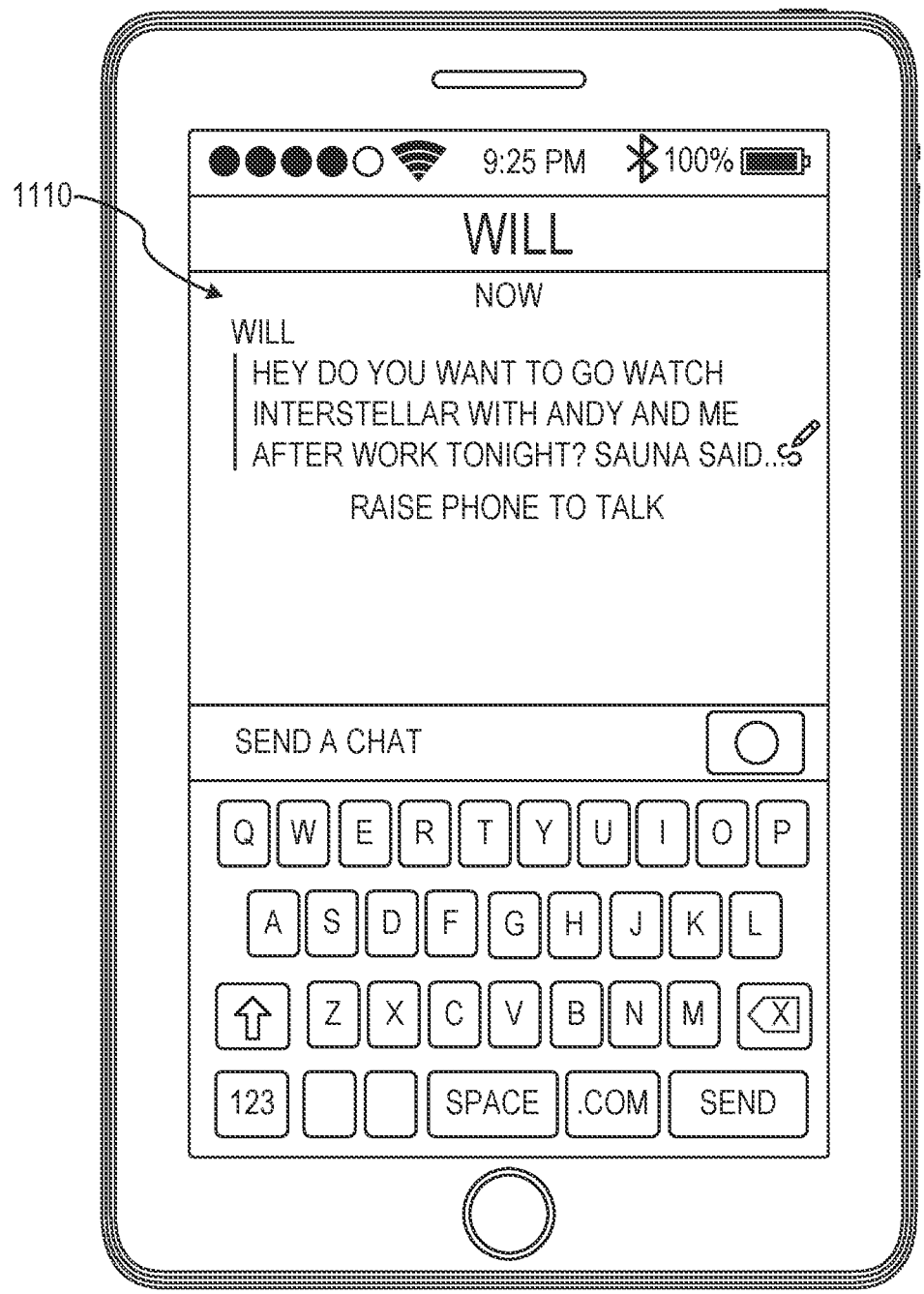

In FIGS. 9-11, the user 106 receives at least a portion of the voice note 910 being left by the second user, via reception of the voice note (i.e., message data) by the communication module 210 and presentation via the presentation module 220. In FIGS. 10-11, the communication module 210 receives additional portions of the voice note 1010 and 1110, respectively, from the second client device and the presentation module 220 presents the additional portions of the voice note 1010 and 1110 on the user interface of the client device 110. In some instances, the presentation module 220 presents the additional portions in segments updating a voice-to-text voice note as the voice note is being composed at and transmitted by the second client device.

As shown in FIGS. 9-11, in some example embodiments, the communication hybridization system 160 can use a combination of the communication module 210 and the presentation module 220 to receive an in-progress voice note 910. The user 106 of the client device 110 can review and the client device 110 can present the content of the in-progress voice note, converted to text by the second client device or the client device 110, prior to initiating two-way (full duplex communication) with the second client device.

After the user 106 has read the portions of the voice note for context, depicted in FIGS. 9-11, the user 106 of the client device 110 can raise the client device 110 (e.g., a smart phone) to the user's 106 ear, causing the sensor module 230 to receive the first sensor data indicative of the first position change, as in operation 520. Based on the first sensor data, the determination module 240 can determine the desired communication mode is that of audio based communication mode, as in operation 530. The management module 250 can cause the communication module 210 and the presentation module 220 to cooperate to change the user interface to the audio based communication mode, enabling the user 106 of the client device 110 to communicate simultaneously using full duplex communication (e.g., a phone call), as in operation 540.

Figure 14:
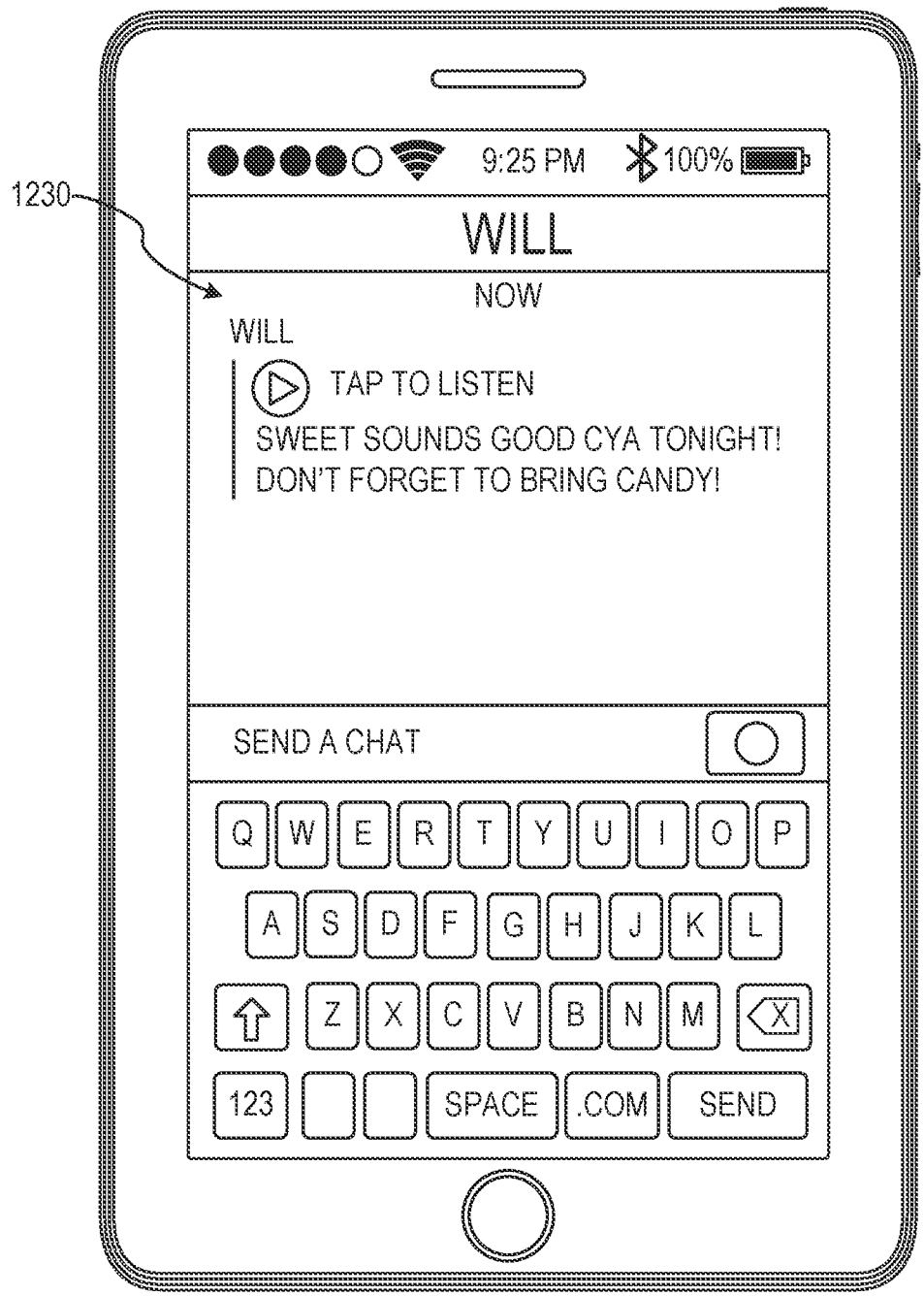

In addition to viewing text converted from voice, users may also be able to listen to actual voice recordings of messages from a sender (as depicted in, e.g., FIG. 14). As noted above, the second user receiving the audio note can simultaneously receive the note in both a text and audio format. As shown in FIG. 14, the audio note can be rendered into a text based message by the communication hybridization system which presents both the text of the audio note and the audio to the recipient. The audio note can be represented by an audio file such as a .wav, .mp3, .mp4, .aac, aiff, or any other suitable audio file. Thus, the recipient can review the audio note as either text or audio. The text based message and the audio file can be presented proximate to one another on a user interface, by the presentation module 220.

Figure 12:
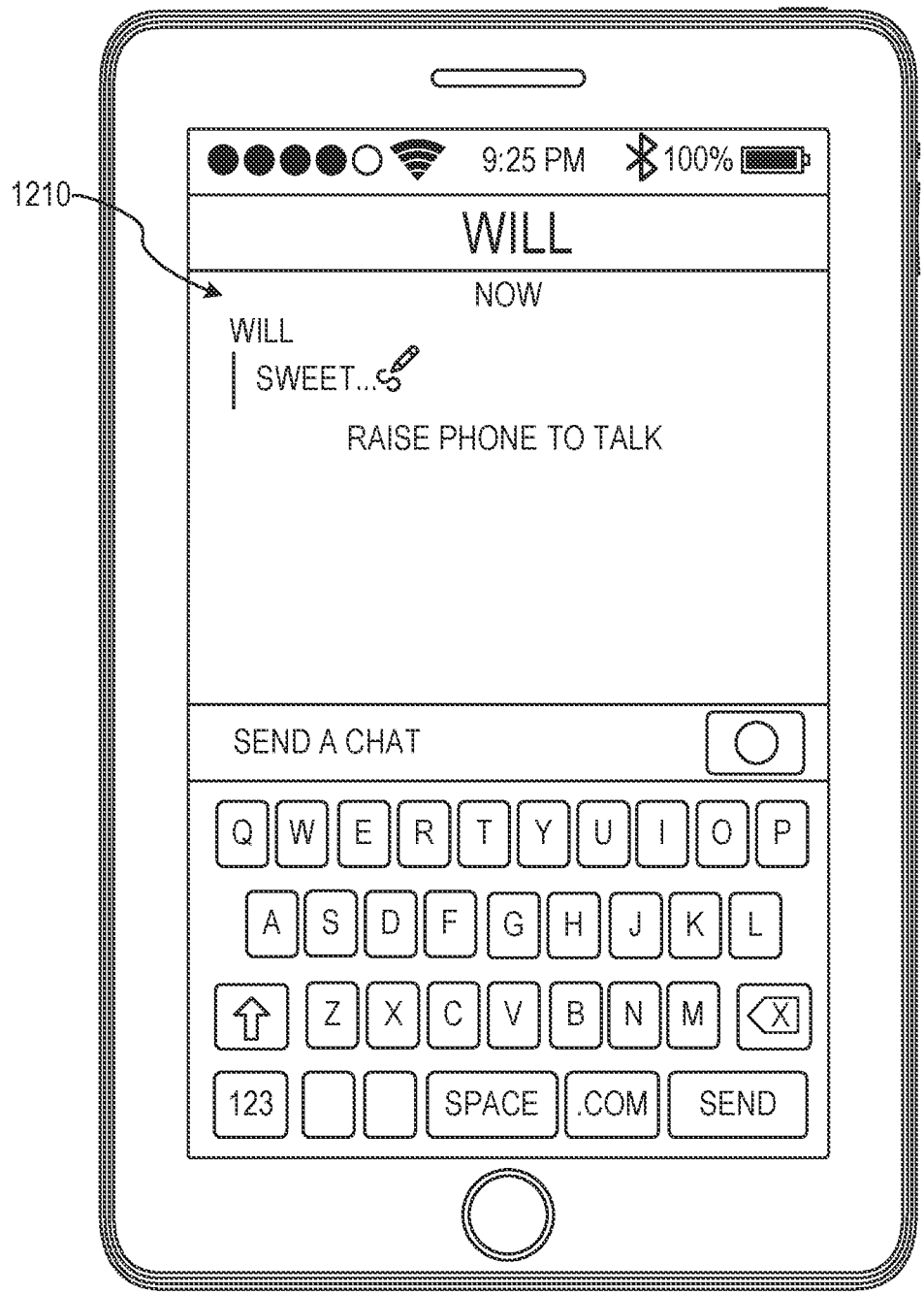
Figure 13:
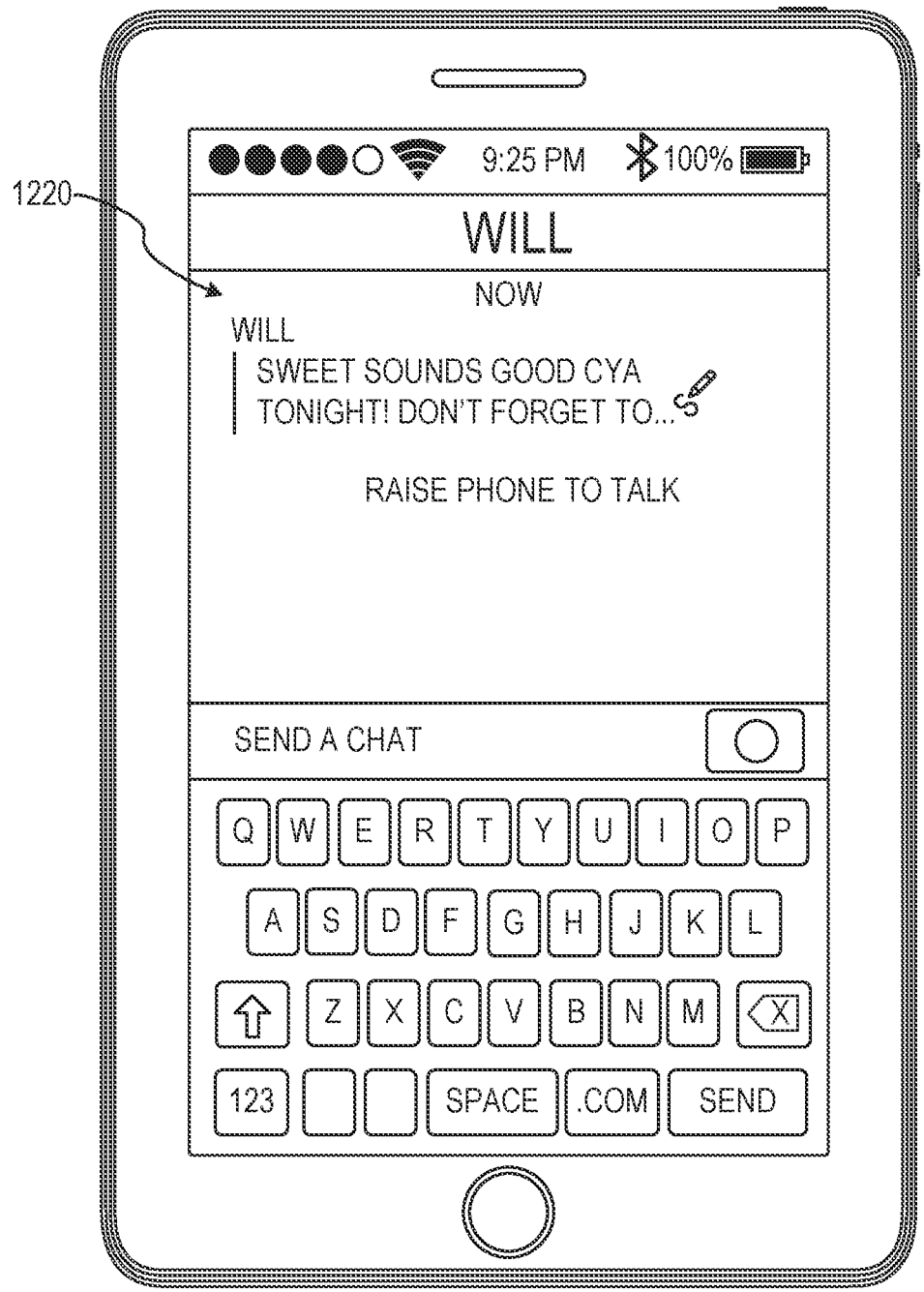

The user 106 lowers the client device 110, causing the sensor module 230 to receive the second sensor data, as in operation 550. The second client device may continue transmitting the audio communications data representative of the second user of the second client device continuing talking, thereby continuing the second user's portion of the chat session. As shown in FIGS. 12-14, the client device 110 can receive a voice-to-text version of the continued voice chat 1210, 1220, and 1230 from the second client device. The communications module 210 in cooperation with the presentation module 220 periodically updates the text version 1220, or an audio version 1230, of the voice chat communication data, while the second client device continues to transmit additional communication data.

Modules, Components, and Logic

Certain embodiments are described herein as including logic or a number of components, modules, or mechanisms. Modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, computer systems (e.g., a standalone computer system, a client computer system, or a server computer system) or hardware modules of a computer system (e.g., at least one hardware processor, a processor, or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented modules that operate to perform operations or functions described herein. As used herein, "processor-implemented module" refers to a hardware module implemented using processors.

Similarly, the methods described herein can be at least partially processor-implemented, with a particular processor or processors being an example of hardware. For example, at least some of the operations of a method can be performed by processors or processor-implemented modules. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an Application Program Interface (API)).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Applications

Figure 15:
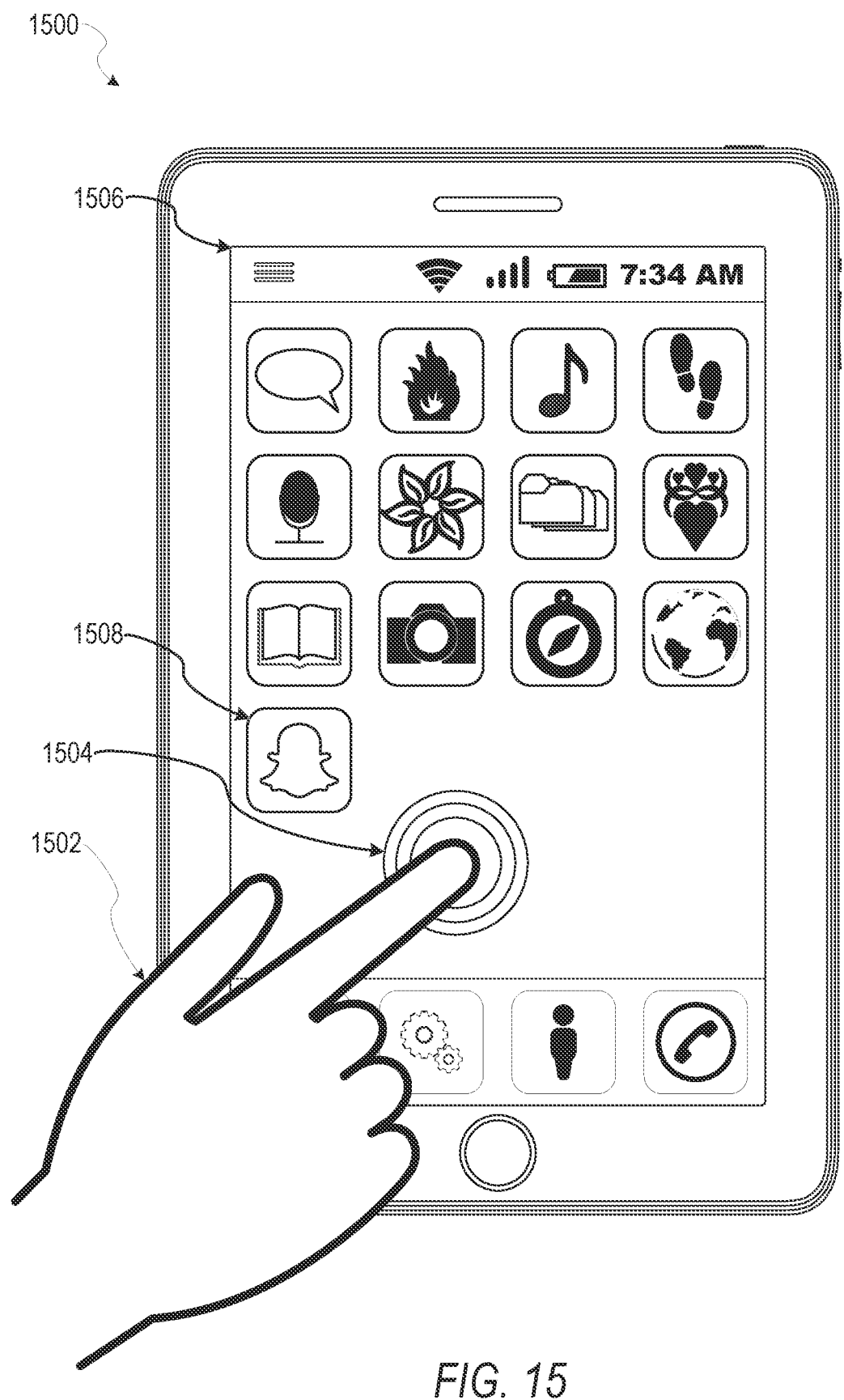
FIG. 15 is a user interface diagram depicting an example mobile device and mobile operating system interface, according to some example embodiments.

FIG. 15 illustrates an example mobile device 1500 executing a mobile operating system (e.g., IOS™, ANDROID™, WINDOWS® Phone, or other mobile operating systems), consistent with some embodiments. In one embodiment, the mobile device 1500 includes a touch screen operable to receive tactile data from a user 1502. For instance, the user 1502 may physically touch 1504 the mobile device 1500, and in response to the touch 1504, the mobile device 1500 may determine tactile data such as touch location, touch force, or gesture motion. In various example embodiments, the mobile device 1500 displays a home screen 1506 (e.g., Springboard on IOS™) operable to launch applications or otherwise manage various aspects of the mobile device 1500. In some example embodiments, the home screen 1506 provides status information such as battery life, connectivity, or other hardware statuses. The user 1502 can activate user interface elements by touching an area occupied by a respective user interface element. In this manner, the user 1502 interacts with the applications of the mobile device 1500. For example, touching the area occupied by a particular icon included in the home screen 1506 causes launching of an application corresponding to the particular icon.

Many varieties of applications (also referred to as "apps") can be executing on the mobile device 1500, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 1500 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 1500 includes a social messaging app 1508 such as SNAPCHAT® that, consistent with some embodiments, allows users to exchange ephemeral messages that include media content.

In this example, the social messaging app 1508 can incorporate aspects of embodiments described herein.

Software Architecture

Figure 16:
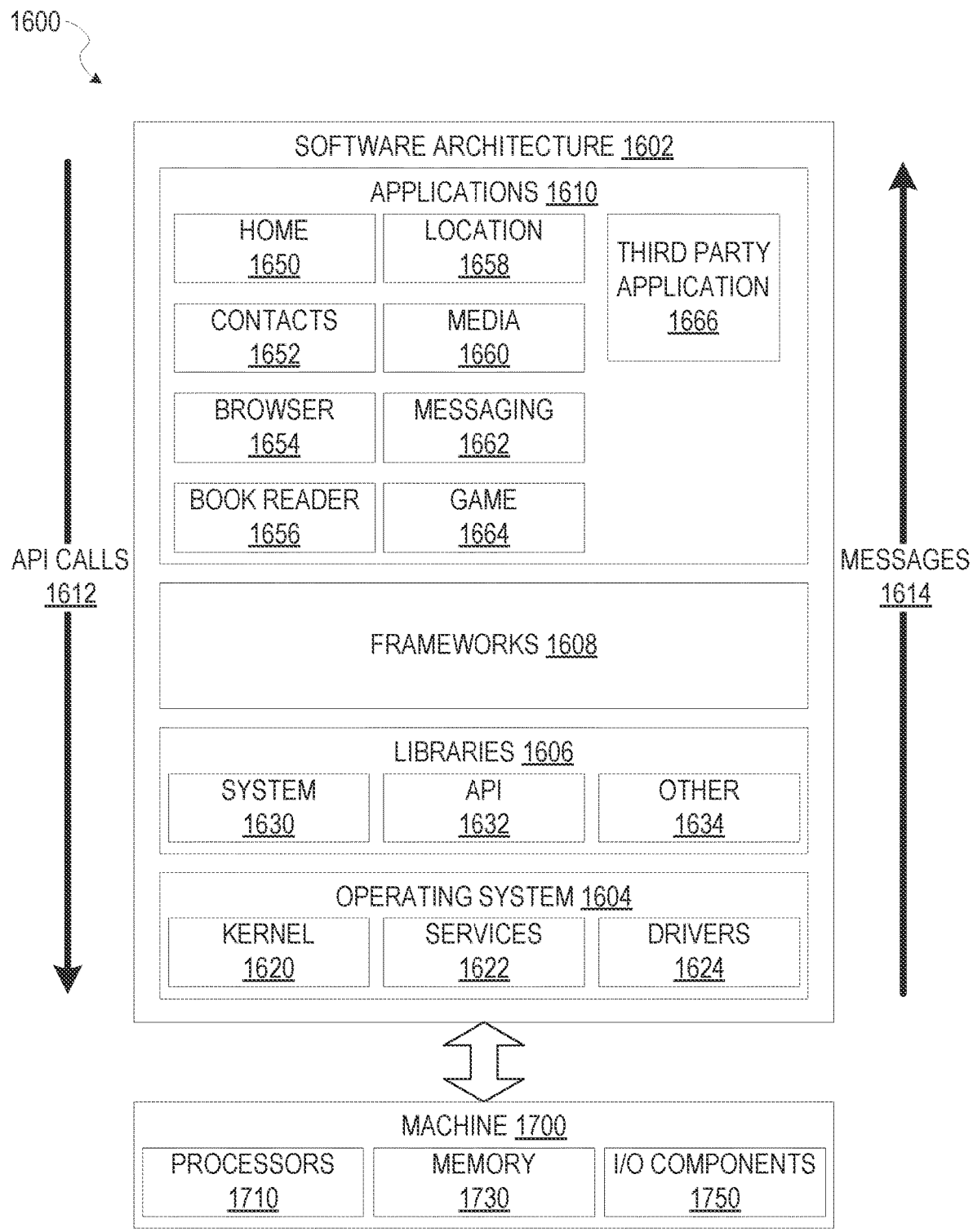
FIG. 16 is a block diagram illustrating an example of a software architecture that may be installed on a machine, according to some example embodiments.

FIG. 16 is a block diagram 1600 illustrating an architecture of software 1602, which can be installed on any of the devices described above. FIG. 16 is merely a non-limiting example of a software architecture, and it will be appreciated that many other architectures can be implemented to facilitate the functionality described herein. In various embodiments, the software 1602 is implemented by hardware such as machine a 1700 of FIG. 17 that includes processors 1710, memory 1730, and I/O components 1750. In this example architecture, the software 1602 can be conceptualized as a stack of layers where each layer may provide a particular functionality. For example, the software 1602 includes layers such as an operating system 1604, libraries 1606, frameworks 1608, and applications 1610. Operationally, the applications 1610 invoke application programming interface (API) calls 1612 through the software stack and receive messages 1614 in response to the API calls 1612, consistent with some embodiments.

In various implementations, the operating system 1604 manages hardware resources and provides common services. The operating system 1604 includes, for example, a kernel 1620, services 1622, and drivers 1624. The kernel 1620 acts as an abstraction layer between the hardware and the other software layers consistent with some embodiments. For example, the kernel 1620 provides memory management, processor management (e.g., scheduling), component management, networking, and security settings, among other functionality. The services 1622 can provide other common services for the other software layers. The drivers 1624 are responsible for controlling or interfacing with the underlying hardware, according to some embodiments. For instance, the drivers 1624 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1606 provide a low-level common infrastructure utilized by the applications 1610. The libraries 1606 can include system libraries 1630 (e.g., C standard library) that can provide functions such as memory allocation functions, string manipulation functions, mathematic functions, and the like. In addition, the libraries 1606 can include API libraries 1632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1606 can also include a wide variety of other libraries 1634 to provide many other APIs to the applications 1610.

The frameworks 1608 provide a high-level common infrastructure that can be utilized by the applications 1610, according to some embodiments. For example, the frameworks 1608 provide various graphic user interface (GUI) functions, high-level resource management, high-level location services, and so forth. The frameworks 1608 can provide a broad spectrum of other APIs that can be utilized by the applications 1610, some of which may be specific to a particular operating system or platform.

In an example embodiment, the applications 1610 include a home application 1650, a contacts application 1652, a browser application 1654, a book reader application 1656, a location application 1658, a media application 1660, a messaging application 1662, a game application 1664, and a broad assortment of other applications such as a third party application 1666. According to some embodiments, the applications 1610 are programs that execute functions defined in the programs. Various programming languages can be employed to create the applications 1610, structured in a variety of manners, such as object-oriented programming languages (e.g., Objective-C, Java, or C++) or procedural programming languages (e.g., C or assembly language). In a specific example, the third party application 1666 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating systems. In this example, the third party application 1666 can invoke the API calls 1612 provided by the operating system 1604 to facilitate functionality described herein.

Example Machine Architecture and Machine-Readable Medium

Figure 17:
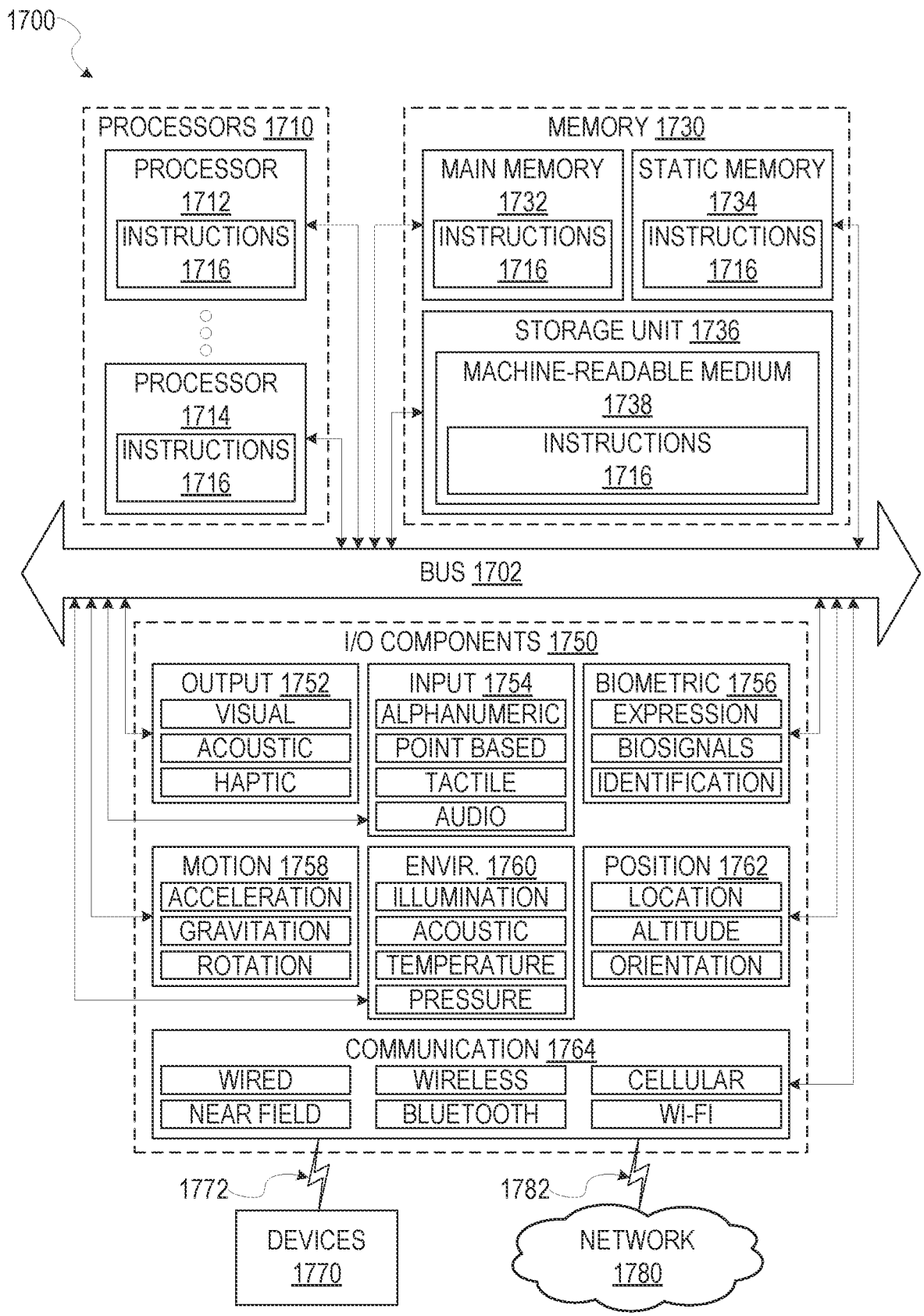
FIG. 17 is a block diagram presenting a diagrammatic representation of a machine in the form of a computer system within which a set of instructions may be executed for causing the machine to perform any of the methodologies discussed herein, according to an example embodiment.

FIG. 17 is a block diagram illustrating components of a machine 1700, according to some embodiments, able to read instructions from a machine-readable medium (e.g., a machine-readable storage medium) and perform any of the methodologies discussed herein. Specifically, FIG. 17 shows a diagrammatic representation of the machine 1700 in the example form of a computer system, within which instructions 1716 (e.g., software, a program, an application, an applet, an app, or other executable code) for causing the machine 1700 to perform any of the methodologies discussed herein can be executed. In alternative embodiments, the machine 1700 operates as a standalone device or can be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1716, sequentially or otherwise, that specify actions to be taken by the machine 1700. Further, while only a single machine 1700 is illustrated, the term "machine" shall also be taken to include a collection of machines 1700 that individually or jointly execute the instructions 1716 to perform any of the methodologies discussed herein.

In various embodiments, the machine 1700 comprises processors 1710, memory 1730, and I/O components 1750, which can be configured to communicate with each other via a bus 1702. In an example embodiment, the processors 1710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) includes, for example, a processor 1712 and a processor 1714 that may execute the instructions 1716. The term "processor" is intended to include multi-core processors that may comprise two or more independent processors (also referred to as "cores") that can execute instructions contemporaneously. Although FIG. 17 shows multiple processors, the machine 1700 may include a single processor with a single core, a single processor with multiple cores (e.g., a multi-core processor), multiple processors with a single core, multiple processors with multiples cores, or any combination thereof.

The memory 1730 comprises a main memory 1732, a static memory 1734, and a storage unit 1736 accessible to the processors 1710 via the bus 1702, according to some embodiments. The storage unit 1736 can include a machine-readable medium 1738 on which are stored the instructions 1716 embodying any of the methodologies or functions described herein. The instructions 1716 can also reside, completely or at least partially, within the main memory 1732, within the static memory 1734, within at least one of the processors 1710 (e.g., within the processor's cache memory), or any suitable combination thereof, during execution thereof by the machine 1700. Accordingly, in various embodiments, the main memory 1732, the static memory 1734, and the processors 1710 are considered machine-readable media 1738.

As used herein, the term "memory" refers to a machine-readable medium 1738 able to store data temporarily or permanently and may be taken to include, but not be limited to, random-access memory (RAM), read-only memory (ROM), buffer memory, flash memory, and cache memory. While the machine-readable medium 1738 is shown in an example embodiment to be a single medium, the term "machine-readable medium" should be taken to include a single medium or multiple media (e.g., a centralized or distributed database, or associated caches and servers) able to store the instructions 1716. The term "machine-readable medium" shall also be taken to include any medium, or combination of multiple media, that is capable of storing instructions (e.g., instructions 1716) for execution by a machine (e.g., machine 1700), such that the instructions, when executed by processors of the machine 1700 (e.g., processors 1710), cause the machine 1700 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1750 include a wide variety of components to receive input, provide output, produce output, transmit information, exchange information, capture measurements, and so on. In general, it will be appreciated that the I/O components 1750 can include many other components that are not shown in FIG. 17. The I/O components 1750 are grouped according to functionality merely for simplifying the following discussion, and the grouping is in no way limiting. In various example embodiments, the I/O components 1750 include output components 1752 and input components 1754. The output components 1752 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1754 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1750 include biometric components 1756, motion components 1758, environmental components 1760, or position components 1762, among a wide array of other components. For example, the biometric components 1756 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1758 include acceleration sensor components (e.g., accelerometer), gravitation sensor components, rotation sensor components (e.g., gyroscope), and so forth. The environmental components 1760 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1762 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1750 may include communication components 1764 operable to couple the machine 1700 to a network 1780 or devices 1770 via a coupling 1782 and a coupling 1772, respectively. For example, the communication components 1764 include a network interface component or another suitable device to interface with the network 1780. In further examples, communication components 1764 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1770 may be another machine or any of a wide variety of peripheral devices (e.g., a peripheral device coupled via a Universal Serial Bus (USB)).

Moreover, in some embodiments, the communication components 1764 detect identifiers or include components operable to detect identifiers. For example, the communication components 1764 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1764, such as location via Internet Protocol (IP) geolocation, location via WI-FI® signal triangulation, location via detecting an BLUETOOTH® or NFC beacon signal that may indicate a particular location, and so forth.

Transmission Medium

In various example embodiments, portions of the network 1780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1780 or a portion of the network 1780 may include a wireless or cellular network, and the coupling 1782 may be a Code Division Multiple Access (CDMA) connection, a Global System for Mobile communications (GSM) connection, or another type of cellular or wireless coupling. In this example, the coupling 1782 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1716 are transmitted or received over the network 1780 using a transmission medium via a network interface device (e.g., a network interface component included in the communication components 1764) and utilizing any one of a number of well-known transfer protocols (e.g., Hypertext Transfer Protocol (HTTP)). Similarly, in other example embodiments, the instructions 1716 are transmitted or received using a transmission medium via the coupling 1772 (e.g., a peer-to-peer coupling) to the devices 1770. The term "transmission medium" shall be taken to include any intangible medium that is capable of storing, encoding, or carrying the instructions 1716 for execution by the machine 1700, and includes digital or analog communications signals or other intangible media to facilitate communication of such software.

Furthermore, the machine-readable medium 1738 is non-transitory (in other words, not having any transitory signals) in that it does not embody a propagating signal. However, labeling the machine-readable medium 1738 "non-transitory" should not be construed to mean that the medium is incapable of movement; the medium should be considered as being transportable from one physical location to another. Additionally, since the machine-readable medium 1738 is tangible, the medium may be considered to be a machine-readable device.

Language

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:

accessing information comprising a plurality of values representing movement of a first client device from a gyroscope and an accelerometer of the first client device;

identifying an individual value of the plurality of values as a primary value based on an amount of change associated with each of the plurality of values;

detecting a change to a physical spatial position or an orientation of the first client device based on the identified individual value;

comparing the change to a predetermined threshold; and selecting a communication mode transition in response to determining that the change transgresses the predetermined threshold, the communication mode comprising a voice transcription mode;

receiving speech input from a first user of the first client device during the voice transcription mode;

transcribing a first portion of the speech input while the speech input is received from the first user to generate a first transcription portion;

causing the first transcription portion to be presented to a second user on a second client device as a voice note while the speech input continues to be received from the first user;

transcribing a second portion of the speech input while the speech input is received from the first user to generate a second transcription portion; and causing the second client device to update the voice note by presenting the second transcription portion as an additional portion of the first transcription portion while the speech input continues to be received from the first user.

2. The method of claim 1, further comprising:

presenting a text input region on a graphical user interface of the first client device;

detecting a partial swipe gesture across a first portion of the text input region;

in response to detecting the partial swipe gesture across the first portion of the text input region, transitioning the communication mode from a text-based communication mode to an audio message mode; and in response to detecting a full swipe gesture across the first portion of the text input region and a second portion of the text input region, transitioning the communication mode to a synchronous mode of communication.

3. The method of claim 1, further comprising:

receiving, by the first client device, a first interaction to transition from a text-based communication mode to a voice-based communication mode with a second client device;

receiving speech input by a microphone of the first client device;

in response to receiving the speech input prior to the first client device completing the transition to the voice-based communication mode, causing the first client device to transition to the voice transcription mode; and generating an audio file comprising the speech input and a text-based communication segment comprising a transcription of the speech input in response to the first client device transitioning to the voice transcription mode and prior to completing the transition to the voice-based communication mode.

4. The method of claim 3, further comprising:

transmitting the audio file and the text-based communication segment to the second client device, the first and second client device completing the transition to the voice-based communication mode after the second client device presents the audio file and the text-based communication segment to a user of the second client device.

5. The method of claim 1, further comprising:

during a synchronous communication session, receiving input by the first client device to terminate the synchronous communication session while a first portion of speech input associated with the synchronous communication session is being received by a second client device;

in response to receiving the input by the first client device, causing the second client device to return to an asynchronous communication mode;

causing the second client device to generate the voice note comprising a remaining portion of the speech input received after the synchronous communication session has been terminated; and receiving, by the first client device, the voice note comprising the remaining portion of the speech input from the second client device.

6. The method of claim 1, further comprising:

receiving sensor data indicative of a position change in the first client device; and based on the position change in the first client device, determining a desired communication mode.

7. The method of claim 6, wherein the receiving the sensor data further comprises:

identifying a value within the sensor data, the value associated with a communication mode of a set of communication modes, the value indicating a distance traveled by the first client device;

comparing the value indicating the distance traveled by the first client device with a predetermined distance threshold; and selecting a desired communication mode as the communication mode associated with the value based on the value transgressing the predetermined distance threshold.

8. The method of claim 1, further comprising presenting on the first client device a waveform to indicate a change in the communication mode from a text-based communication mode to the voice transcription mode, the waveform being presented in a communication interface.

9. A system, comprising:

one or more processors configured to perform operations comprising:

accessing information comprising a plurality of values representing movement of a first client device from a gyroscope and an accelerometer of the first client device;

identifying an individual value of the plurality of values as a primary value based on an amount of change associated with each of the plurality of values;

detecting a change to a physical spatial position or an orientation of the first client device based on the identified individual value;

comparing the change to a predetermined threshold; and selecting a communication mode transition in response to determining that the change transgresses the predetermined threshold, the communication mode comprising a voice transcription mode;

receiving speech input from a first user of the first client device during the voice transcription mode;

transcribing a first portion of the speech input while the speech input is received from the first user to generate a first transcription portion;

causing the first transcription portion to be presented to a second user on a second client device as a voice note while the speech input continues to be received from the first user;

transcribing a second portion of the speech input while the speech input is received from the first user to generate a second transcription portion; and causing the second client device to update the voice note by presenting the second transcription portion as an additional portion of the first transcription portion while the speech input continues to be received from the first user.

10. The system of claim 9, further comprising operations for:

detecting a swipe gesture on the first client device in which a finger contacts a display screen and slides to a point on the display screen;

in response to determining that the finger remains in contact with the display screen at the point on the display screen, initiating recording of a voice note including presenting a waveform;

in response to determining that the finger has been released from the point on the display screen after initiating recording of the voice note, ending recording of the voice note and initiating transmission of the voice note to the second client device.

11. The system of claim 9, further comprising operations for:

selecting the individual value as the primary value in response to determining that the individual value is associated with a greatest amount of change among the plurality of values.

12. The system of claim 9, further comprising operations for:

determining a first difference corresponding to a first of the plurality of values, the first difference representing a difference between a starting and ending quantity of the orientation of the first client device;

determining a second difference corresponding to the individual value, the second difference representing a difference between a starting and ending quantity of the physical spatial position of the first client device;

determining that the second difference is greater than the first difference; and selecting the individual value as the primary value for comparing to the predetermined threshold in response to determining that the second difference is greater than the first difference, wherein the communication mode corresponds to an audio communication mode associated with the physical spatial position of the first client device.

13. The system of claim 9, further comprising operations for:

during a synchronous communication session, receiving input by the first client device to terminate the synchronous communication session while a first portion of speech input associated with the synchronous communication session is being received by a second client device;

in response to receiving the input by the first client device, causing the second client device to return to an asynchronous communication mode;

causing the second client device to generate the voice note comprising a remaining portion of the speech input received after the synchronous communication session has been terminated; and receiving, by the first client device, the voice note comprising the remaining portion of the speech input from the second client device.

14. The system of claim 9, further comprising operations for:

receiving sensor data indicative of a position change in the first client device; and based on the position change in the first client device, determining a desired communication mode.

15. The system of claim 14, wherein the receiving the sensor data further comprises:

identifying a value within the sensor data, the value associated with a communication mode of a set of communication modes, the value indicating a distance traveled by the first client device;

comparing the value indicating the distance traveled by the first client device with a predetermined distance threshold; and selecting a desired communication mode as the communication mode associated with the value based on the value transgressing the predetermined distance threshold.

16. The system of claim 9, further comprising operations for displaying on the second client device an indication that the first client device is creating the voice note.

17. A non-transitory machine-readable storage medium storing processor executable instructions that, when executed by a processor of a machine, cause the machine to perform operations comprising:

accessing information comprising a plurality of values representing movement of a first client device from a gyroscope and an accelerometer of the first client device;

identifying an individual value of the plurality of values as a primary value based on an amount of change associated with each of the plurality of values;

detecting a change to a physical spatial position or an orientation of the first client device based on the identified individual value;

comparing the change to a predetermined threshold; and selecting a communication mode transition in response to determining that the change transgresses the predetermined threshold, the communication mode comprising a voice transcription mode;

receiving speech input from a first user of the first client device during the voice transcription mode;

transcribing a first portion of the speech input while the speech input is received from the first user to generate a first transcription portion;

causing the first transcription portion to be presented to a second user on a second client device as a voice note while the speech input continues to be received from the first user;

transcribing a second portion of the speech input while the speech input is received from the first user to generate a second transcription portion; and causing the second client device to update the voice note by presenting the second transcription portion as an additional portion of the first transcription portion while the speech input continues to be received from the first user.

18. The non-transitory machine-readable storage medium of claim 17, further comprising operations for:
- receiving, by the first client device, a first interaction to transition from a text-based communication mode to a voice-based communication mode with a second client device;
- receiving speech input by a microphone of the first client device;
- in response to receiving the speech input prior to the first client device completing the transition to the voice-based communication mode, causing the first client device to transition to the voice transcription mode; and
- generating an audio file comprising the speech input and a text-based communication segment comprising a transcription of the speech input in response to the first client device transitioning to the voice transcription mode and prior to completing the transition to the voice-based communication mode.

19. The non-transitory machine-readable storage medium of claim 17, wherein the predetermined threshold is specified by user input or dynamically determined.

20. The non-transitory machine-readable storage medium of claim 17, further comprising operations for:
- during a synchronous communication session, receiving input by the first client device to terminate the synchronous communication session while a first portion of speech input associated with the synchronous communication session is being received by a second client device;
- in response to receiving the input by the first client device, causing the second client device to return to an asynchronous communication mode;
- causing the second client device to generate a voice note comprising a remaining portion of the speech input received after the synchronous communication session has been terminated; and
- receiving, by the first client device, the voice note comprising the remaining portion of the speech input from the second client device.

* * * * *